US009523315B2

(12) United States Patent
Hyodo et al.

(10) Patent No.: US 9,523,315 B2
(45) Date of Patent: Dec. 20, 2016

(54) ENGINE CONTROL DEVICE FOR WORK VEHICLE

(71) Applicant: KCM Corporation, Hyogo (JP)

(72) Inventors: Koji Hyodo, Kasumigaura (JP); Isamu Aoki, Tsukuba (JP); Tetsuji Tanaka, Abiko (JP); Keigo Kikuchi, Ryugasaki (JP)

(73) Assignee: KCM Corporation, Hyogo (JP)

( * ) Notice: Subject to any disclaimer, the term of this patent is extended or adjusted under 35 U.S.C. 154(b) by 273 days.

(21) Appl. No.: 14/376,286

(22) PCT Filed: Feb. 4, 2013

(86) PCT No.: PCT/JP2013/052510
§ 371 (c)(1),
(2) Date: Aug. 1, 2014

(87) PCT Pub. No.: WO2013/115399
PCT Pub. Date: Aug. 8, 2013

(65) Prior Publication Data
US 2014/0379243 A1 Dec. 25, 2014

(30) Foreign Application Priority Data

Feb. 3, 2012 (JP) ................................. 2012-021749

(51) Int. Cl.
*F02D 31/00* (2006.01)
*F02D 41/02* (2006.01)
(Continued)

(52) U.S. Cl.
CPC ............ *F02D 31/001* (2013.01); *B60K 31/00* (2013.01); *F02D 31/007* (2013.01);
(Continued)

(58) Field of Classification Search
CPC ............ F02D 2200/10; F02D 2200/602; F02D 2200/1006; F02D 31/001–31/009; F02D 29/00–29/06; F16H 2059/467
(Continued)

(56) References Cited

U.S. PATENT DOCUMENTS 5,863,275 A * 1/1999 Nozaki .................. B60W 10/06
477/107
7,370,475 B2 * 5/2008 Nakamura ............ B60W 10/30
60/449
(Continued)

FOREIGN PATENT DOCUMENTS

| EP | 2 065 243 A2 | 6/2009 |
|---|---|---|
| EP | 2 395 219 A1 | 12/2011 |
| JP | 2003-13773 A | 1/2003 |
| JP | 2008-223695 A | 9/2008 |
| JP | 2009-74266 A | 4/2009 |
| JP | 2009-196393 A | 9/2009 |
| JP | 2011-122706 A | 6/2011 |

OTHER PUBLICATIONS

International Search Report (PCT/ISA/210) dated Mar. 12, 2013 with English translation (five pages).
(Continued)

*Primary Examiner* — Lindsay Low
*Assistant Examiner* — Robert Werner
(74) *Attorney, Agent, or Firm* — Crowell & Moring LLP

(57) ABSTRACT

An engine control device for work vehicle includes: a target rotation speed setting unit that sets a target rotation speed of an engine corresponding to an operation amount of an accelerator pedal; a rotation speed control unit that controls a rotation speed of the engine according to the target rotation speed; a travel driving unit that transmits rotation of the engine to wheels via a torque converter; a speed ratio detection unit that detects a speed ratio between an input shaft and an output shaft of the torque converter; and a target rotation speed correction unit that corrects the target rotation speed set by the target rotation speed setting unit so as to
(Continued)

increase the target rotation speed based on the speed ratio when the operation amount of the accelerator pedal is smaller than a predetermined value and the speed ratio detected by the speed ratio detection unit is smaller than a predetermined value within a range which is equal to or greater than 0 and less than 1.

4 Claims, 20 Drawing Sheets

(51) Int. Cl.
    *F02D 41/08*       (2006.01)
    *B60K 31/00*      (2006.01)
    *F16H 63/50*      (2006.01)
    *F16H 59/46*      (2006.01)
    *F02D 29/02*      (2006.01)

(52) U.S. Cl.
    CPC ....... *F02D 41/0215* (2013.01); *F02D 41/083* (2013.01); *F16H 63/50* (2013.01); *B60W 2510/1005* (2013.01); *B60W 2710/0644* (2013.01); *B60Y 2400/426* (2013.01); *F02D 29/02* (2013.01); *F02D 2200/101* (2013.01); *F02D 2200/602* (2013.01); *F02D 2400/12* (2013.01); *F16H 2059/467* (2013.01)

(58) Field of Classification Search
    USPC .... 701/110; 123/339.17–339.18, 399, 198 C
    See application file for complete search history.

(56) References Cited

U.S. PATENT DOCUMENTS

| | | | |
|---|---|---|---|
| 7,457,702 B2 * | 11/2008 | Takamatsu | F02D 41/0225 701/103 |
| 7,493,978 B2 * | 2/2009 | Nakamura | E02F 9/2246 180/53.4 |
| 7,509,200 B2 * | 3/2009 | Ito | F02D 41/0215 477/116 |
| 7,543,447 B2 * | 6/2009 | Itoga | B60W 10/06 60/431 |
| 8,315,783 B2 * | 11/2012 | Hyodo | B60W 10/06 123/319 |
| 8,655,557 B2 * | 2/2014 | Hyodo | B60W 10/06 477/110 |
| 8,777,808 B2 * | 7/2014 | Hyodo | E02F 9/20 180/53.4 |
| 2007/0073466 A1 | 3/2007 | Tamai et al. | |
| 2009/0062063 A1 | 3/2009 | Yamanaka et al. | |
| 2012/0004814 A1 * | 1/2012 | Hyodo | F02D 29/00 701/50 |

OTHER PUBLICATIONS

Extended European Search Report issued in counterpart European Application No. 13743737.2 dated Jan. 7, 2016 (Seven (7) pages).

\* cited by examiner

ENGINE CONTROL DEVICE FOR WORK VEHICLE

TECHNICAL FIELD

The present invention is related to an engine control device for a work vehicle, such as a wheel loader.

BACKGROUND ART

An engine control device for a work vehicle, such as a wheel loader, is known (see Patent Literature 1). The engine control device receives first information indicating that an accelerator operation amount has become less than a predetermined low operation amount due to, for instance, returning operation at the accelerator pedal and second information indicating that a forward/reverse switching over signal has been supplied to a torque transmission unit, and, upon receiving both the first information and the second information, outputs a signal for supplying fuel, quantity of which is greater than a quantity of fuel corresponding to the accelerator operation amount, to an engine.

CITATION LIST

Patent Literature

PATENT LITERATURE 1: Japanese Laid Open Patent Publication No. 2003-13773

SUMMARY OF INVENTION

Technical Problem

An example of excavation work performed by the wheel loader is as follows.
(1) An operator operates a forward/reverse switching over switch to a forward position and depresses an accelerator pedal so that the wheel loader advances toward a mound of soil and dirt and digs a bucket into the mound.
(2) The operator operates control levers, such as an arm control lever and a bucket control lever, so as to take soil or the like into the bucket.

In the excavation work with the wheel loader, in order to fill the bucket with the soil or the like, the operator may release and depress the accelerator pedal alternately with the bucket dug into the mound while operating the control levers, such as the arm control lever and the bucket control lever. In the engine control device described in Patent Literature 1, the engine stall is prevented by increasing a rotation speed to be higher than a rotation speed corresponding to the accelerator operation amount when the forward/reverse switching operation is performed. Therefore, in the wheel loader equipped with the engine control device described in Patent Literature 1, when the accelerator pedal is eased off while the bucket is dug into the mound, the engine rotation speed will be controlled to be a rotation speed based on the accelerator operation amount.

In the wheel loader equipped with the engine control device described in Patent Literature 1, the engine output torque may become insufficient to drive a front work device when operating the control levers, such as the arm control lever and the bucket control lever, after easing off on the accelerator pedal with the bucket dug into the mound, and as a result, the engine may be stalled.

Moreover, in the wheel loader equipped with the engine control device described in Patent Literature 1, the engine output torque decreases if the accelerator pedal is operated in a release direction while traveling an uphill. In such a case, if the load, which is caused by its own weight and applied to the engine via wheels and a torque converter, exceeds the engine output torque, the engine may be stalled.

Solution to Problem

According to a first aspect of the present invention, an engine control device for work vehicle comprises: a target rotation speed setting unit that sets a target rotation speed of an engine corresponding to an operation amount of an accelerator pedal; a rotation speed control unit that controls a rotation speed of the engine according to the target rotation speed; a travel driving unit that transmits rotation of the engine to wheels via a torque converter; a speed ratio detection unit that detects a speed ratio between an input shaft and an output shaft of the torque converter; and a target rotation speed correction unit that corrects the target rotation speed set by the target rotation speed setting unit so as to increase the target rotation speed based on the speed ratio when the operation amount of the accelerator pedal is smaller than a predetermined value and the speed ratio detected by the speed ratio detection unit is smaller than a predetermined value within a range which is equal to or greater than 0 and less than 1.

According to a second aspect of present invention, in the engine control device for work vehicle according to the first aspect, it is preferable that the target rotation speed correction unit increases an increase amount for increasing the target rotation speed with decrease in the speed ratio.

According to a third aspect of the present invention, in the engine control device for work vehicle according to the first or second aspect, it is preferable that when the target rotation speed is corrected by the target rotation speed correction unit, the rotation speed control unit gradually increases the rotation speed of the engine toward the target rotation speed corrected by the target rotation speed correction unit; and when the target rotation speed setting unit again sets the target rotation speed that is not corrected and corresponds to the operation amount of the accelerator pedal after the target rotation speed was corrected by the target rotation speed correction unit, the rotation speed control unit immediately decreases the rotation speed of the engine to the target rotation speed set by the target rotation speed setting unit.

According to a fourth aspect of present invention, in the engine control device for work vehicle according to any one of the first to third aspects, it is preferable to further include an operation detection unit that detects that a front work device has been operated, wherein: the target rotation speed correction unit corrects the target rotation speed set by the target rotation speed setting unit so as to increase the target rotation speed based on the speed ratio, taking into account operation of the front work device detected by the operation detection unit.

Advantageous Effect of the Invention

According to the present invention, the front work device can be engaged in operation without stalling the engine even when the control lever is operated after the accelerator pedal is eased off while the bucket is dug into the mound. Furthermore, the engine stall can be prevented even when the accelerator pedal is eased off while traveling an uphill.

DESCRIPTION OF EMBODIMENTS

First Embodiment

Figure 1:
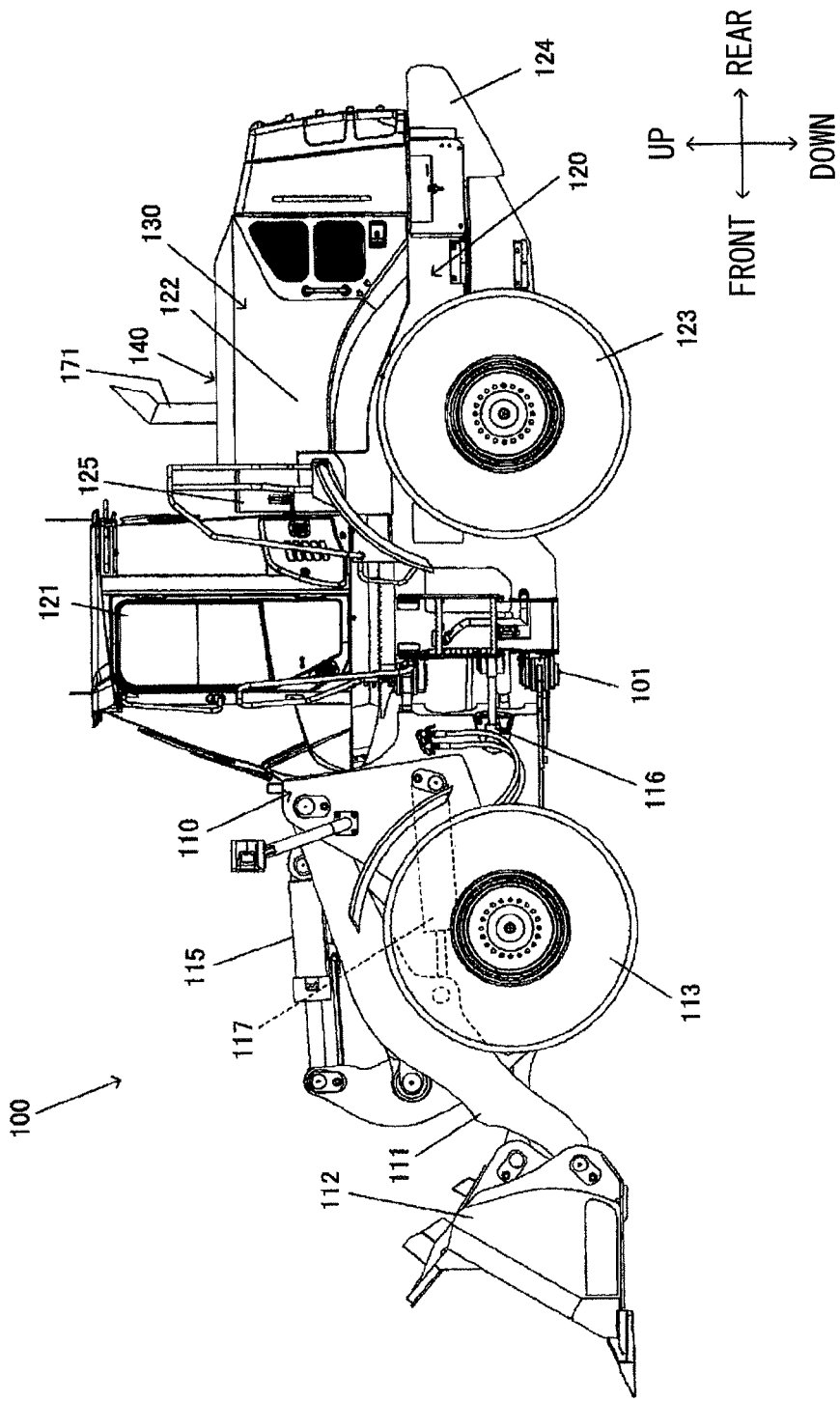
FIG. 1 is a side view of a wheel loader that is an example of a work vehicle according to a first embodiment of the present invention.

An embodiment of an engine control device for a work vehicle according to the present invention will now be explained with reference to drawings. FIG. 1 is a side view of a wheel loader 100 that is an example of a work vehicle according to a first embodiment of the present invention. A wheel loader 100 includes a front body 110 that includes an arm 111, a bucket 112, wheels 113 and the like and a rear body 120 that includes an operator's cab 121, an engine compartment 122, wheels 123 and the like.

A lift arm (hereafter referred to simply as the "arm") 111 is attached to the front body 110 so as to be vertically rotatable and is rotated via drive of an arm cylinder 117. The bucket 112 is attached at a front end of the arm 111 so as to be rotatable frontward and backward relative to the arm 111 and is rotated via drive of a bucket cylinder 115. The front body 110 and the rear body 120 are rotatably connected with each other by a center pin 101 and the front body 110 turns right and left with respect to the rear body 120 by extension or retraction of a steering cylinder (not shown).

Figure 2:
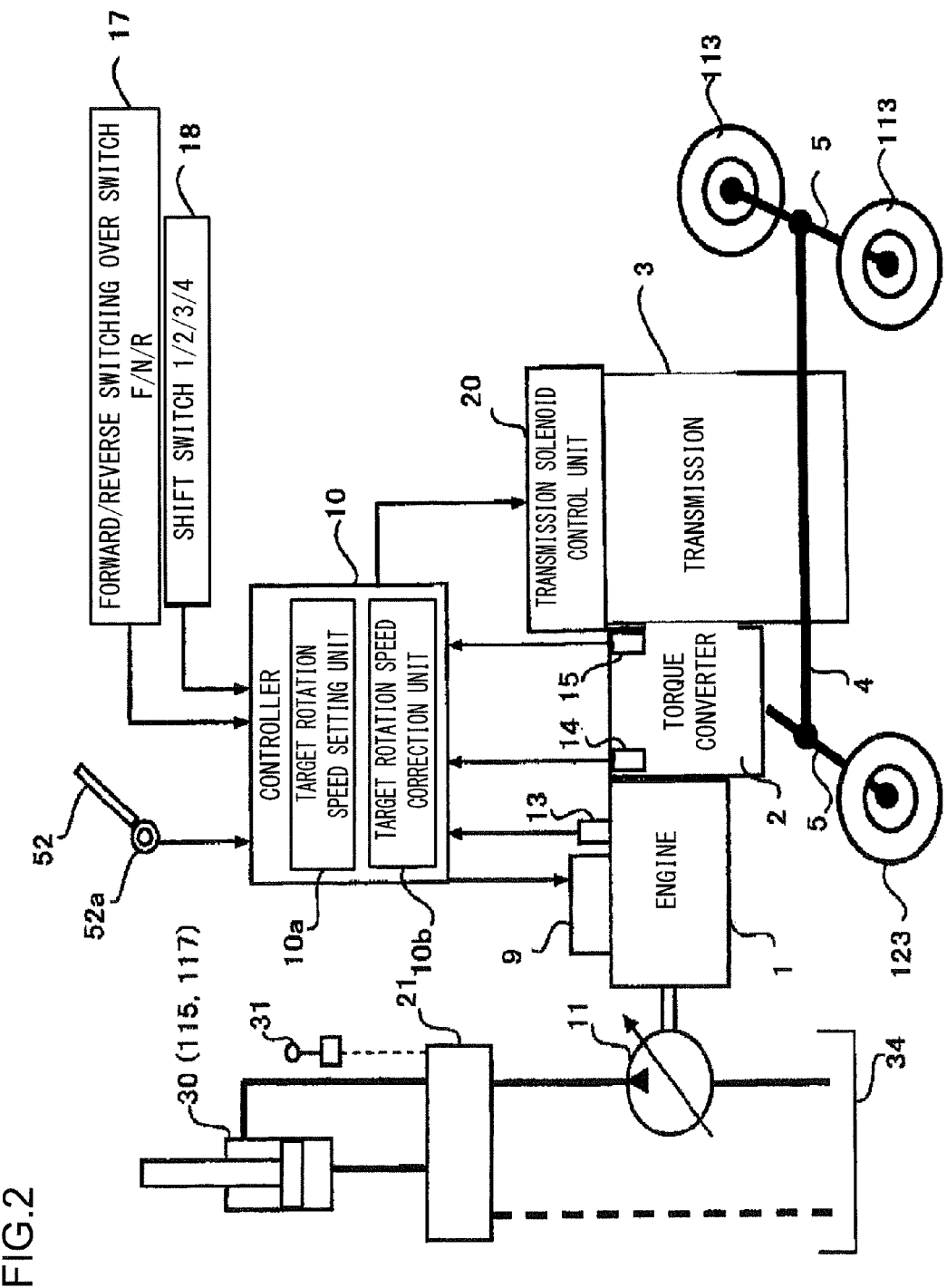
FIG. 2 shows a schematic diagram of a control system of the wheel loader equipped with an engine control device according to the first embodiment of present invention.

FIG. 2 shows a schematic diagram of a control system of the wheel loader equipped with the engine control device according to the first embodiment of the present invention. An input shaft of a torque converter 2 is coupled to an output shaft of an engine 1, and an output shaft of the torque converter 2 is coupled to a transmission 3. The torque converter 2 is a well-known fluid clutch that is constituted with an impeller, a turbine, and a stator, and rotation of the engine 1 is transmitted to the transmission 3 through the torque converter 2. The transmission 3 includes a hydraulic clutch that shifts the speed stage to one of first speed through fourth speed, and a rotation speed of the output shaft of the torque converter 2 is changed via the transmission 3. Rotation after the speed change is transmitted to the wheels 113 and 123 through a propeller shaft 4 and axles 5, and thus the wheel loader 100 travels.

A variable displacement hydraulic pump 11 for work is driven by the engine 1 and discharges pressure oil. The discharged oil from the hydraulic pump 11 is guided to a work actuator 30 via a control valve 21, and thus, the work actuator 30 is driven. The control valve 21 is operated by a control lever 31, and controls the flow of the pressure oil from the hydraulic pump 11 to the actuator 30. In FIG. 2, the control lever 31 represents an arm control lever or a bucket control lever, the actuator 30 represents the arm cylinder 117 or the bucket cylinder 115, and the control valve 21 represents an arm control valve or a bucket control valve, for the sake of simplicity. When assuming that the control lever 31 is the arm control lever, the actuator 30 corresponds to the arm cylinder 117 and the control valve 21 corresponds to the arm control valve. When assuming that the control lever 31 is the bucket control lever, the actuator 30 corresponds to the bucket cylinder 115 and the control valve 21 corresponds to the bucket control valve.

The displacement of the pump is changed by a well-known regulator (not shown). The regulator changes the pump displacement according to the pump discharge pressure so as, for instance, to perform a fixed torque control for setting a work torque to be constant. It is to be noted that a fixed displacement pump, such as a gear pump or the like, may be employed as the hydraulic pump 11.

Figure 3:
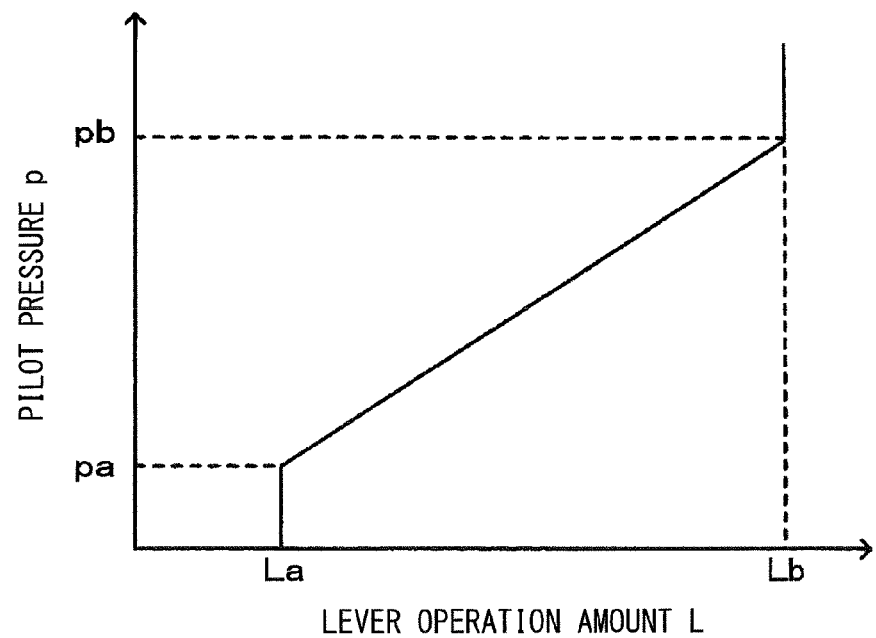
FIG. 3 shows relationship between lever operation amount of a control lever and pilot pressure.

The arm control lever corresponding to the control lever 31 is an operating member for operating the arm 111 and outputs a command for raising/lowering the arm 111. FIG. 3 shows relationship between a lever operation amount L of the control lever 31 and a pilot pressure p. The arm control lever is a hydraulic pilot type operating lever that outputs a pilot pressure p according to a lever operation amount L as shown in FIG. 3. The pilot pressure p does not increase when the lever operation amount L is less than a minimum lever operation amount La, and the pilot pressure p is increased to pa when the lever operation amount L becomes the minimum lever operation amount La.

The control valve 21 (the arm control valve) is controlled to be switched over when the pilot pressure is equal to or greater than pa, taking into account the dead band of the arm control lever. A pilot pressure pb is a pressure value corresponding to a maximum lever operation amount Lb of the arm control lever. The pilot pressure p increases in proportion to the lever operation amount L if the lever operation amount L is within a range between the minimum lever operation amount La and the maximum lever operation amount Lb. It is to be noted that the bucket control lever is also a hydraulic pilot type operating lever, similar to the arm control lever, that outputs a command for tilting/dumping the bucket 112.

The torque converter 2 has a function to increase output torque with respect to input torque, i.e., a function to make a torque ratio 1 or greater. The torque ratio decreases with increase in a torque converter speed ratio e (=output rotation speed No/input rotation speed Ni), which is a ratio of a rotation speed No of the output shaft to a rotation speed Ni of the input shaft of the torque converter 2. For example, if a travel load increases during traveling at a constant engine rotation speed, the rotation speed No of the output shaft of the torque converter 2 decreases, i.e., the vehicle speed decreases and the torque converter speed ratio e is reduced. Since, at the same time, the torque ratio increases, the vehicle can travel with a greater driving force for travelling (i.e. traction force). It is to be noted that the torque converter speed ratio e shows a positive value when a rotation direction of the input shaft of the torque converter 2 is the same as that of the output shaft of the torque converter, whereas the torque converter speed ratio e is a negative value when the rotation directions of the input shaft and the output shaft are different from one another. Therefore, the speed ratio e shows a negative value when the vehicle travels in a direction opposite to a direction instructed through a forward/reverse switching over switch 17 (when traveling in an opposite direction). It is to be noted that the speed ratio e becomes equal to or greater than 1 when an accelerator pedal 52 is eased off while traveling on level ground or when the vehicle travels downhill without requiring a driving force.

A controller 10 is configured to include an arithmetic processing unit that includes a CPU, a ROM, a RAM, other peripheral circuits, and the like. Signals from a rotation speed detector 14 that detects the rotation speed Ni of the input shaft of the torque converter 2, a rotation speed detector 15 that detects the rotation speed No of the output shaft of the torque converter 2, and a shift switch 18 that indicates an upper limit of the speed stage among the first speed through the fourth speed are input to the controller 10.

The controller 10 calculates the torque converter speed ratio e (=the output rotation speed No/the input rotation speed Ni) based on the rotation speed Ni of the input shaft of the torque converter 2 detected by the rotation speed detector 14 and the rotation speed No of the output shaft of the torque converter 2 detected by the rotation speed detector 15.

The controller 10 is connected with an accelerator operation amount detector 52a that detects a pedal operation amount S of the accelerator pedal 52, and an engine rotation speed sensor 13 that detects an actual rotation speed Na of the engine 1 and outputs an actual rotation speed signal to the controller 10.

Figure 4:
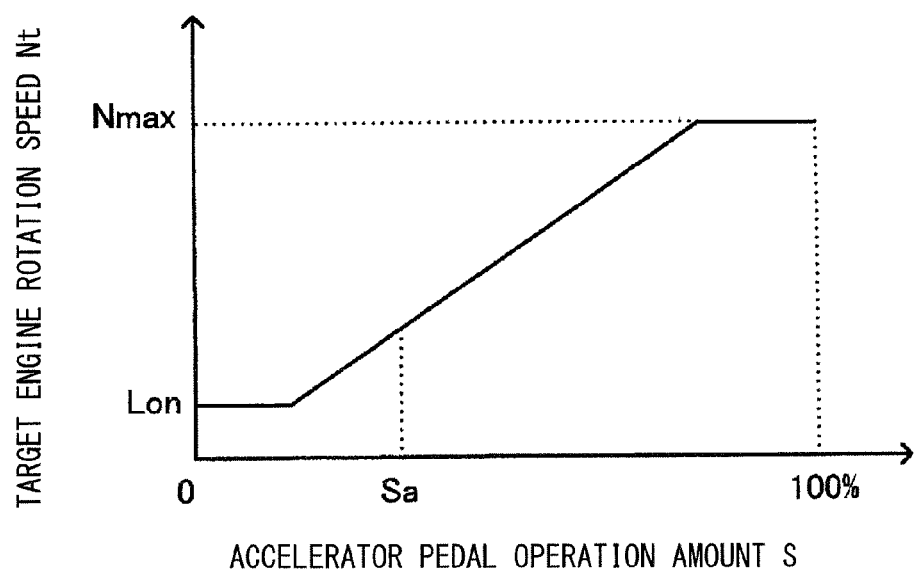
FIG. 4 shows relationship between pedal operation amount of an accelerator pedal and target engine rotation speed.

The controller 10 includes a target rotation speed setting unit 10a, embodied as a functional unit, that sets a target engine rotation speed Nt of the engine 1 depending on the pedal operation amount S of the accelerator pedal 52 detected by the accelerator operation amount detector 52a. The controller 10 outputs a control signal corresponding to the target engine rotation speed Nt set by the target rotation speed setting unit 10a to an engine controller 9 so as to control the actual rotation speed (number of rotations) of the engine 1. FIG. 4 shows relationship between the pedal operation amount S of the accelerator pedal 52 and the target engine rotation speed Nt. The target engine rotation speed Nt increases as the pedal operation amount S of the accelerator pedal 52 increases, and the target engine rotation speed Nt becomes a rated rotation speed Nmax (for example, 2000 rpm) when the accelerator pedal is depressed to a full extent.

The controller 10 outputs the control signal corresponding to this target engine rotation speed Nt to the engine controller 9 so as to control the actual rotation speed Na of the engine 1 to the target engine rotation speed Nt. When the operator wishes to increase the vehicle speed or travel driving force, he/she increases the pedal operation amount S of the accelerator pedal 52 so as to raise the engine rotation speed.

The engine controller 9 compares the actual rotation speed Na of the engine 1 detected by the engine rotation speed sensor 13 with the target engine rotation speed Nt input from the controller 10 and controls a fuel injection system (not shown) so as to bring the actual rotation speed Na of the engine 1 close to the target engine rotation speed Nt.

The controller 10 determines whether or not the pedal operation amount S from the accelerator operation amount detector 52a is smaller than a predetermined value Sa. The predetermined value Sa is set as a threshold value that indicates the accelerator pedal 52 is hardly stepped on, and is stored in advance in the ROM or RAM in the controller 10.

As shown in FIG. 2, the controller 10 is connected with the forward/reverse switching over switch 17 that instructs the forward travel or the reverse travel for the vehicle and the controller 10 detects an operating position (forward (F)/neutral (N)/reverse (R)) of the forward/reverse switching over switch 17. The controller 10 outputs to a transmission solenoid control unit 20 a control signal for engaging a forward clutch (not shown) in the transmission 3 when the forward/reverse switching over switch 17 is switched to the forward (F) position. The controller 10 outputs to the transmission solenoid control unit 20 a control signal for engaging a reverse clutch (not shown) in the transmission 3 when the forward/reverse switching over switch 17 is switched to the reverse (R) position.

In the transmission solenoid control unit 20, upon receiving the control signal for engaging the forward clutch or the reverse clutch (not shown), a clutch control valve (not shown) provided in the transmission solenoid control unit 20 increases clutch pressure for operating the forward clutch or the reverse clutch (not shown). As a result, the forward clutch or the reverse clutch (not shown) is engaged, and thus a travel direction of the work vehicle is switched to the forward direction or to the reverse direction.

When the forward/reverse switching over switch 17 is switched to the neutral (N) position, the controller 10 outputs to the transmission solenoid control unit 20 a control signal for releasing the forward clutch and the reverse clutch (not shown). In the transmission control device 20, upon receiving the control signal for releasing the forward clutch and the reverse clutch (not shown), the clutch control valve (not shown) provided in the transmission solenoid control unit 20 reduces the clutch pressure for operating the forward clutch and the reverse clutch (not shown). As a result, the forward clutch and the reverse clutch are released and the transmission 3 enters into the neutral state.

Figure 5:
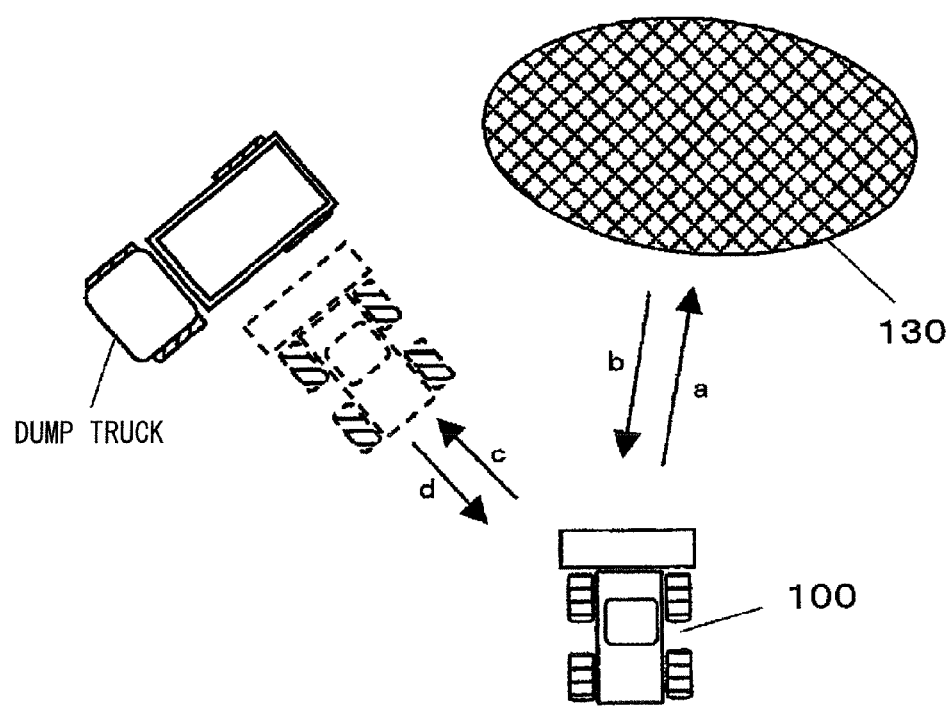
FIG. 5 is an illustration that shows V-shape loading, which is one of the methods to load soil or the like onto a dump truck.

FIG. 5 is an illustration that shows V-shape loading, which is one of the methods to load soil or the like onto a dump truck. In the V-shape loading, firstly, as indicated by an arrow a, the wheel loader 100 moves forward and scoops soil or the like.

Figure 6:
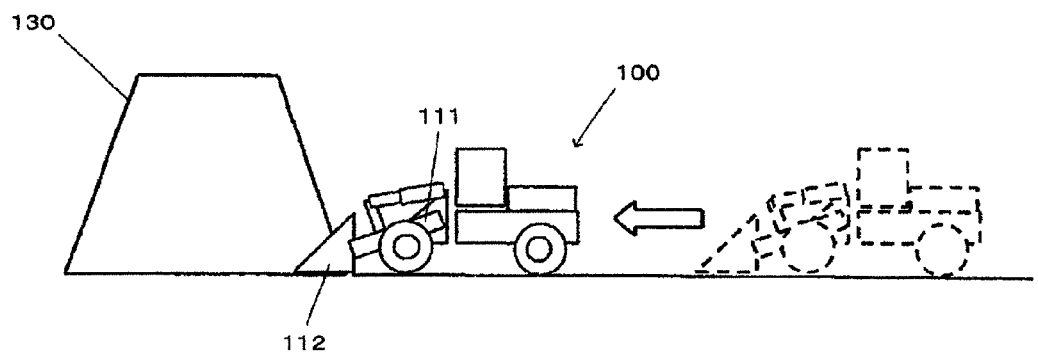
FIG. 6 illustrates excavation work with the wheel loader.

FIG. 6 illustrates excavation work with the wheel loader 100. In the work for scooping soil or the like with the wheel loader 100, that is, excavation work, generally as shown in FIG. 6, the bucket 112 is dug into a mound 130 of the soil or the like, and then the arm 111 is raised after operating the bucket 112 or the bucket 112 and the arm 111 are operated simultaneously and finally the arm 111 only is raised.

The wheel loader 100 is once moved backward as indicated by an arrow b in FIG. 5 when the excavation work ends. As indicated by an arrow c, the wheel loader 100 moves forward to the dump truck, stops short of the dump truck, loads the scooped soil or the like onto the dump truck, and as indicated by an arrow d, the wheel loader 100 moves backward to the original position. The above is a basic operation of the V-shape loading method.

In the excavation work as shown in FIG. 6, the accelerator pedal 52 may be released and stepped on repeatedly and alternately with the bucket 112 dug into the mound while the control lever 31, such as the arm control lever or the bucket control lever, is being operated so as to fill the bucket 112 with the soil or the like. However, the engine output torque may become insufficient to drive a front work device configured by including the arm 111 and the bucket 112 when operating the control lever 31, such as the arm control lever or the bucket control lever, in a state where the accelerator pedal 52 is eased off, and as a result, the engine may be stalled.

In the present embodiment, in order to prevent the engine stall attributable to operation of the control lever 31 when easing off on the accelerator pedal 52 during the excavation work, the rotation speed of the engine 1 is controlled as described below.

As shown in FIG. 2, the controller 10 includes a target rotation speed correction unit 10b, embodied as a functional unit. The target rotation speed correction unit 10b corrects the target engine rotation speed Nt set by the target rotation speed setting unit 10a to be increased based on the torque converter speed ratio e when the pedal operation amount S of the accelerator pedal 52 is smaller than the predetermined value Sa and the torque converter speed ratio e calculated by the controller 10 is less than a predetermined value e1 which falls in a range equal to or greater than 0 and less than 1.

Figure 7:
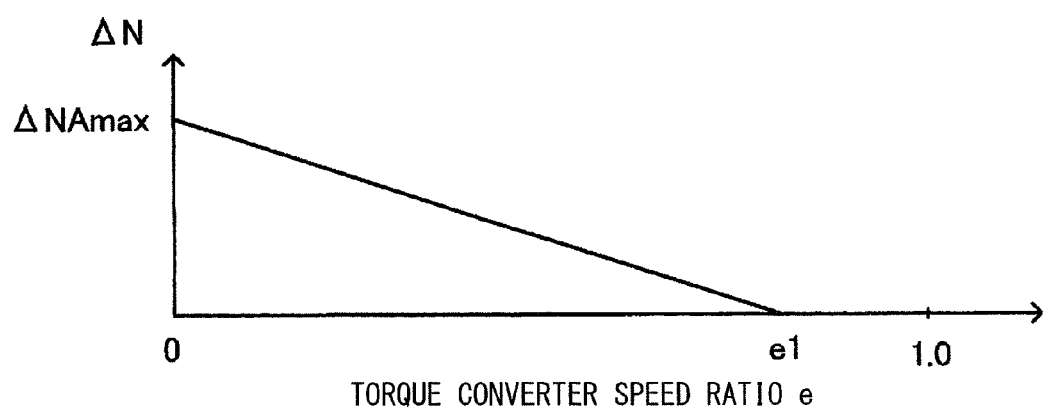
FIG. 7 shows relationship between torque converter speed ratio and increase amount in rotation speed.

FIG. 7 shows relationship between the torque converter speed ratio e and an increase amount ΔN in the rotation speed. As shown in FIG. 7, ΔN is 0 when the torque converter speed ratio e is equal to or greater than the predetermined value e1 (for example, 0.8) (e≥e1) which falls in the range equal to or greater than 0 and less than 1. The rotation speed increase amount ΔN increases from 0 to an upper limit value ΔNAmax (for example, 100 rpm) in proportion to decrease in the torque converter speed ratio e when the torque converter speed ratio e is within the range equal to or greater than 0 and less than e1 (0≤e<e1). The characteristic shown in FIG. 7 is stored in advance in the ROM or the RAM in the controller 10. The target rotation speed correction unit 10b corrects the target engine rotation speed Nt so as to increase the rotation speed by a greater extent as the load is greater by increasing the increase amount in the target engine rotation speed Nt with decrease in the torque converter speed ratio e in accordance with the characteristic as shown in FIG. 7. In the present description, it is to be noted that a state in which the torque converter speed ratio e is equal to or greater than e1 (e≥e1) is defined as a normal state, whereas a state in which the torque converter speed ratio e is within the range which is equal to or greater than 0 and less than e1 (0≤e<e1) is defined as a load increase state. In a combined stall state during the excavation work, the torque converter speed ratio e is extremely close to 0. The torque converter speed ratio e during a forward travel on an uphill is greater than the torque converter speed ratio e during the excavation work but still smaller than e1.

Figure 8:
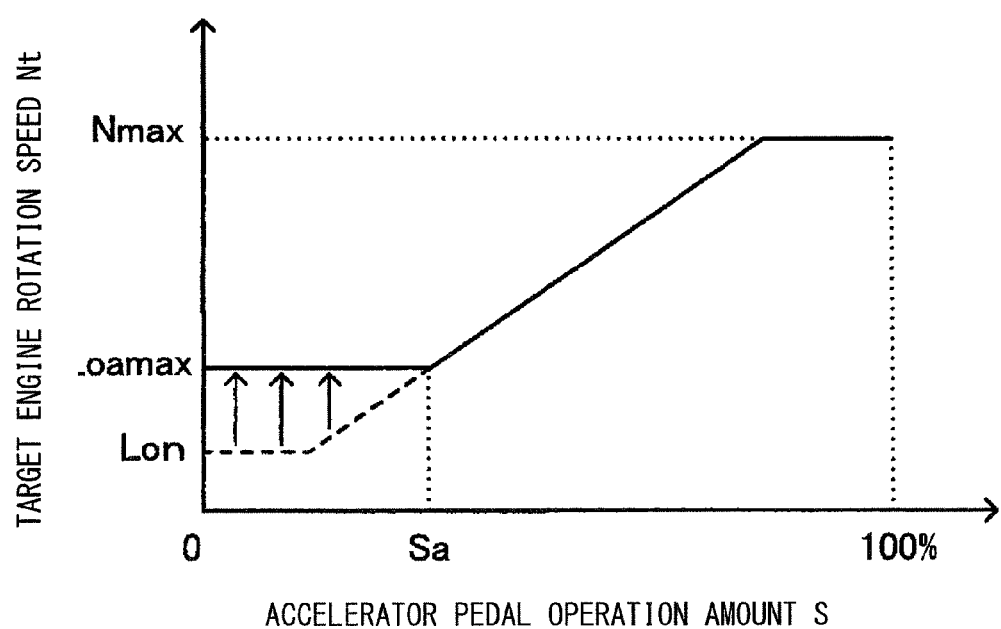
FIG. 8 shows relationship between the pedal operation amount of the accelerator pedal and the target engine rotation speed.

FIG. 8 shows relationship between the pedal operation amount S of the accelerator pedal 52 and the target engine rotation speed Nt. In FIG. 8, in a range of the pedal operation amount S of the accelerator pedal 52 which is equal to or greater than 0 and less than Sa, a characteristic in the normal state is indicated by a broken line and a corrected characteristic (with a maximum value Loamax) by which the target engine rotation speed Nt is increased in the load increase state is indicated by a solid line.

As shown in FIG. 8, a low idle rotation speed Lo which corresponds to the target engine rotation speed Nt when the accelerator pedal is not depressed (i.e., the pedal operation amount S=0) is set to Lon (for example, 900 rpm) if the wheel loader 100 is in the normal state, that is, the torque converter speed ratio e is equal to or greater than the predetermined value e1.

The low idle rotation speed Lo which corresponds to the target engine rotation speed Nt when the accelerator pedal is not depressed (i.e., the pedal operation amount S=0) is corrected to a predefined value in a range equal to or greater than Lon and equal to or smaller than Loamax if the wheel loader 100 is in the load increase state, that is, the torque converter speed ratio e is equal to or greater than 0 and less than e1. For instance, the low idle rotation speed Lo is corrected to Loamax (for example, 1000 rpm) by adding ΔNAmax (for example, 100 rpm) to the rotation speed Lon (for example, 900 rpm) set by the target rotation speed setting unit 10a (Loamax=Lon+ΔNAmax) in a torque converter stall state (the torque converter speed ratio e=0).

Figure 9:
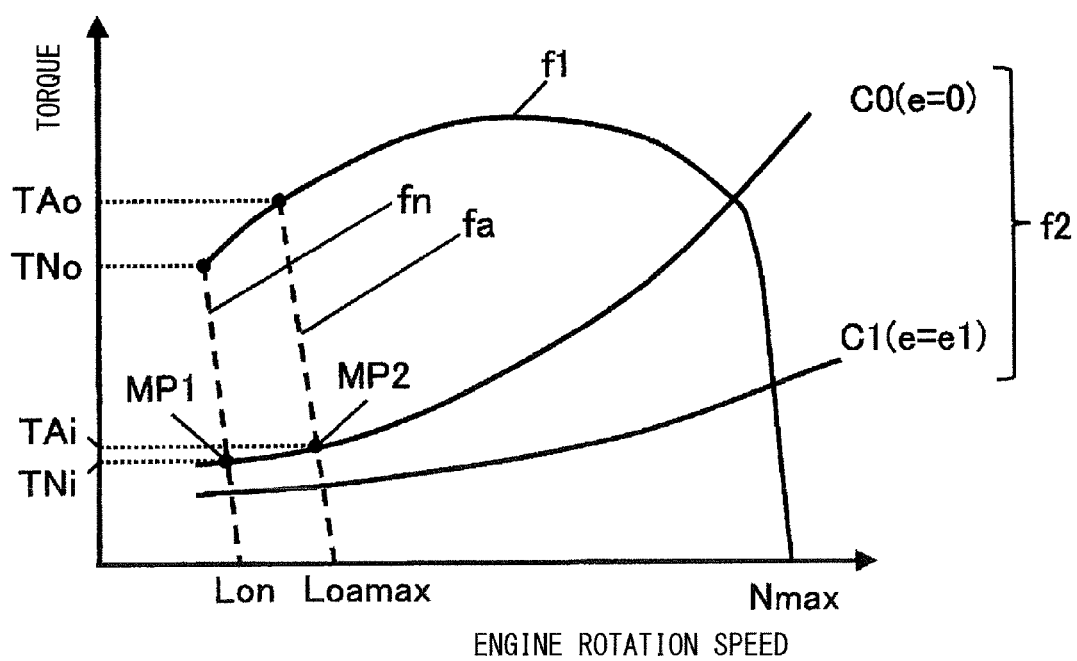
FIG. 9 is a travel performance diagram (torque diagram) representing relation between the engine rotation speed and torque.

FIG. 9 is a travel performance diagram (torque diagram) representing relation between the engine rotation speed and torque. In the figure, a characteristic f1 represents an engine output torque, and characteristics f2 (C0, C1) represent input torque of the torque converter 2 when the torque converter speed ratio e is 0 and e1, respectively. In the figure, a characteristic fn (indicated by a broken line) represents an engine output torque when the low idle rotation speed Lo=Lon, and a characteristic fa (indicated by a broken line) represents an engine output torque when the low idle rotation speed Lo is increased by the maximum increase amount ΔNAmax, that is, when the low idle rotation speed Lo=Loamax.

The torque converter input torque increases in proportion to a square of the rotation speed Ni of the torque converter input shaft, and the torque converter input torque decreases as the torque converter speed ratio e becomes greater. Intersections of the characteristic f1 and the characteristics f2 (C0, C1) are designated as matching points, and when the vehicle is traveling, the engine output torque and the torque converter input torque are at the values of the matching points. Explanation will be given below with a torque converter stall state (the torque converter speed ratio e=0) as a representative example. In FIG. 9, the matching point shifts from MP1 to MP2 if the low idle rotation speed Lo is increased by the maximum increase amount ΔNAmax.

As shown in FIG. 9, a torque converter input torque TAi at the matching point MP2 in the low idle rotation speed Lo=Loamax is greater than a torque converter input torque TNi at the matching point MP1 in the low idle rotation speed Lo=Lon. On the other hand, an engine output torque TAo with the low idle rotation speed Lo=Loamax is greater than an engine output torque TNo with the low idle rotation speed Lo=Lon.

As shown in FIG. 9, an extent of rising (TAi−TNi) by which the torque converter input torque is increased when the low idle rotation speed Lo is increased by the maximum increase amount ΔNAmax is smaller than an extent of rising (TAo−TNo) by which the engine output torque is increased. Thus, a pump absorption torque that can be used in a hydraulic circuit of excavation system can be increased by correcting and increasing the low idle rotation speed Lo. In other words, the pump absorption torque Tpa (=TAo−TAi) in the low idle rotation speed Lo=Loamax after increase correction is larger than the pump absorption torque Tpn (=TNo−TNi) with the low idle rotation speed Lo=Lon in the normal state.

Figure 10:
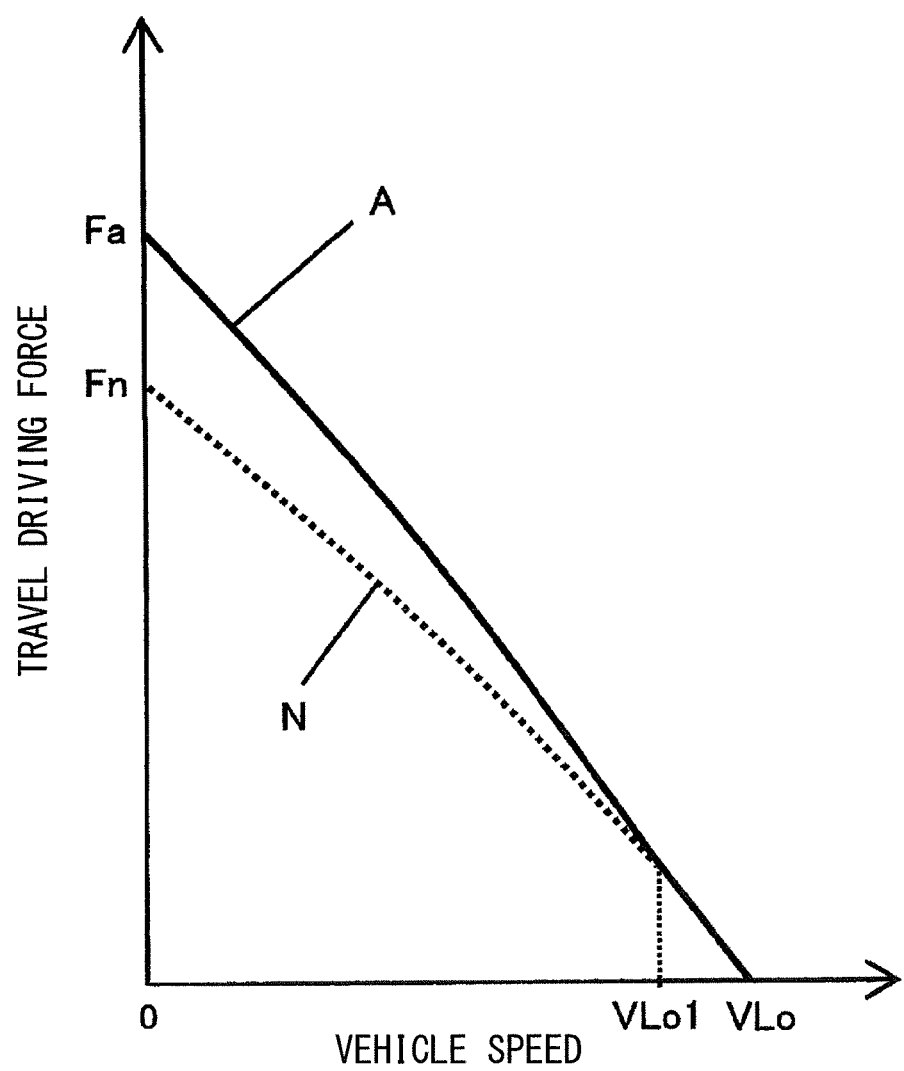
FIG. 10 shows relationship between vehicle creep speed and travel driving force.

FIG. 10 shows relationship between a vehicle creep speed and a travel driving force. In FIG. 10, a characteristic N shows a driving performance when the vehicle creeps or travels slowly at the low idle rotation speed Lo=Lon, and a characteristic A shows a driving performance when the vehicle creeps at the low idle rotation speed Lo=Loamax, with both of the characteristics represent characteristics at the second speed as an example. As shown in FIG. 10, the travel driving force is larger at a lower speed (low-speed-high-torque), and the travel driving force is smaller at a faster speed (high-speed-low-torque) for both of the characteristics N and A.

As shown in FIG. 10, in a range of the vehicle speed which is equal to or greater than 0 and smaller than VLo1, the travel driving force at a time of creeping with the low idle rotation speed Lo corrected and increased (hereafter, it may be simply referred to as "with correction") is larger than the travel driving force at a time of creeping in the normal state (without correction), and a difference therebetween becomes smaller as the vehicle speed increases. The difference between the travel driving forces is the greatest at a time of stall, and a travel driving force Fa with correction, for instance, is approximately 1.2 times greater than a travel driving force Fn in the normal state. The characteristic N and the characteristic A coincide with one another when the vehicle speed is equal to or greater than VLo1 and equal to or smaller than VLo, and a maximum vehicle speed when creep traveling is a predetermined value VLo for both of the characteristics N and A. The characteristic N and the characteristic A match with one another in the range of the vehicle speed equal to or greater than VLo1 and equal to or smaller than VLo because the rotation speed increase amount ΔN is 0 when the torque converter speed ratio e is equal to or larger than e1 as shown in FIG. 7.

Target rotation speed correction control will now be explained with reference to a flowchart of FIG. 11.

Figure 11:
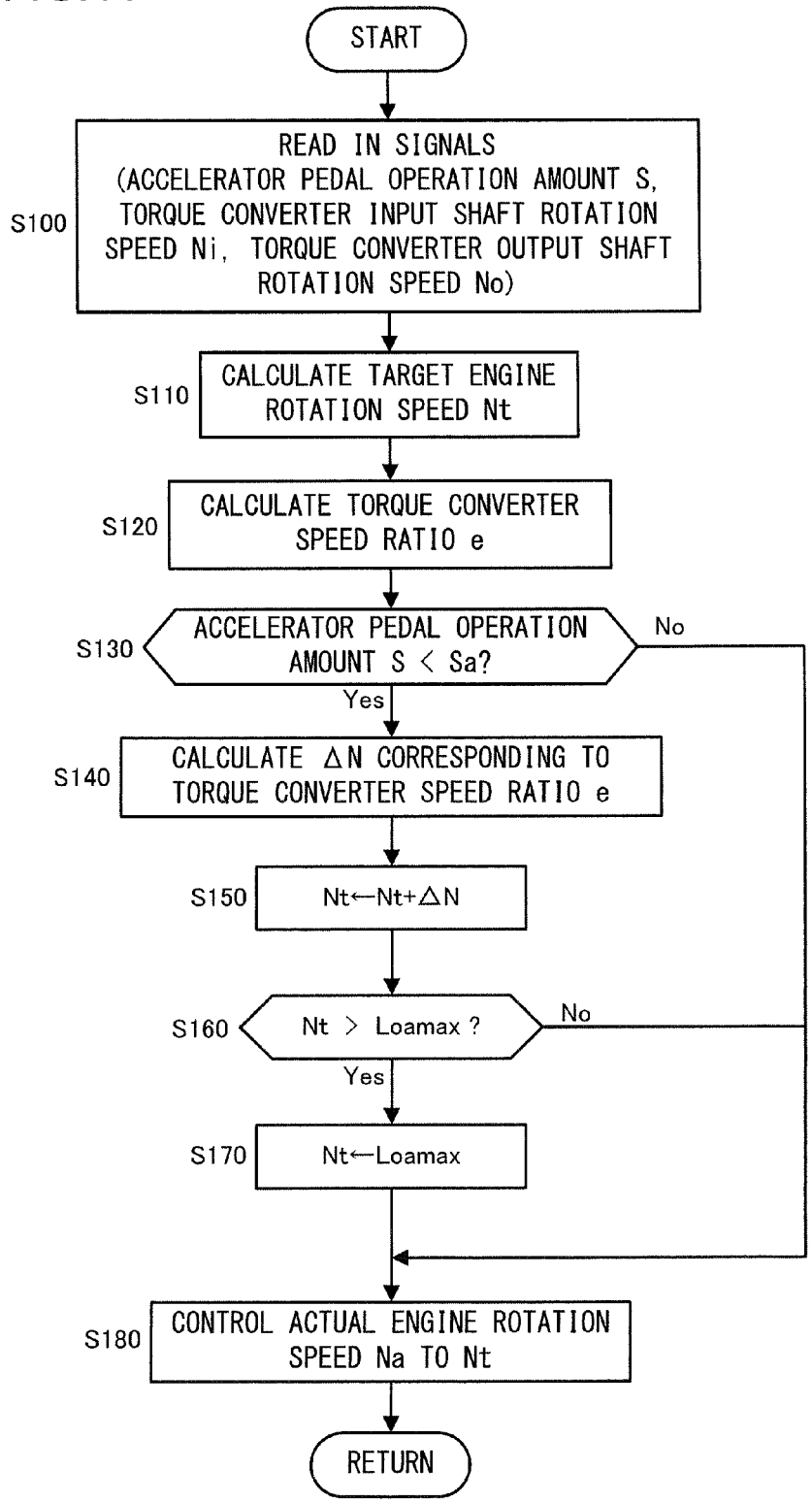
FIG. 11 is a flowchart that shows operation of engine rotation speed increase correction process in the engine control device according to the first embodiment of the present invention.

FIG. 11 is a flowchart that shows operation of engine rotation speed increase correction process in the engine control device according to the first embodiment of the present invention. A program enabling the processing shown in FIG. 11 is started up as an ignition switch (not shown) is turned on, and the processing is subsequently executed repeatedly by the controller 10.

In the description, "ignition on" refers to an action of turning on the ignition key and operating it to an operating position, and "ignition off" refers to an action of operating the ignition key to a stopping position.

In step S100, information on the pedal operation amount S of the accelerator pedal 52 detected by the accelerator operation amount detector 52a, information on the rotation speed Ni of the input shaft of the torque converter 2 detected by the rotation speed detector 14 and information on the rotation speed No of the output shaft of the torque converter 2 detected by the rotation speed detector 15 are obtained, and then the processing proceeds to step S110.

In step S110, the target rotation speed setting unit 10a calculates the target engine rotation speed Nt corresponding to the pedal operation amount S detected by the accelerator operation amount detector 52a based on the characteristic shown in FIG. 4 which is stored in advance in the ROM or the RAM in the controller 10, and then the processing proceeds to step 120.

In step 120, the controller 10 calculates the torque converter speed ratio e by using the signals from the rotation speed detectors 14 and 15, and then the processing proceeds to step S130.

In step S130, it is determined whether or not the pedal operation amount S obtained in step S100 is smaller than the predetermined threshold value Sa. If affirmative decision is made in step S130, the processing proceeds to step S140 and correction process for increasing the target engine rotation speed Nt based on the torque converter speed ratio e is executed (step S140 to step S170) as described later. If negative decision is made in step S130, the processing proceeds to step S180 without correcting the target engine rotation speed Nt.

In step S180, the controller 10 outputs the control signal to the engine controller 9 so as to control the actual rotation speed Na of the engine 1 to the target engine rotation speed Nt. If negative decision is made in step S130, the actual rotation speed Na of the engine 1 is controlled to the target engine rotation speed Nt corresponding to the pedal operation amount S of the accelerator pedal 52 set by the target rotation speed Nt (see FIG. 4) in step S180.

If it is determined in step S130 that the pedal operation amount S is smaller than the threshold value Sa, the target rotation speed correction unit 10b calculates in step S140 the rotation speed increase amount ΔN for correction according to the torque converter speed ratio e based on the predefined characteristic in FIG. 7. In step S150, the target rotation speed correction unit 10b adds ΔN obtained in step S140 to the target engine rotation speed Nt calculated in step S110 and sets the calculated value as a new target engine rotation speed Nt, and then the processing proceeds to step S160. In other words, in step S150, the target engine rotation speed Nt calculated in step S110 is corrected to be increased.

In step S160, it is determined whether or not the reset, that is, corrected target engine rotation speed Nt is larger than the maximum low idle rotation speed Loamax. If affirmative decision is made in step S160, the processing proceeds to step S170, whereas the processing proceeds to step S180 if negative decision is made.

In step S170, the maximum low idle rotation speed Loamax is set as the target engine rotation speed Nt. In other words, the maximum value of the target engine rotation speed Nt is limited to the maximum low idle rotation speed Loamax when the pedal operation amount S of the accelerator pedal 52 is equal to or greater than 0 and less than Sa.

In step S180, the controller 10 outputs the control signal to the engine controller 9 so as to control the actual rotation speed Na of the engine 1 to the target engine rotation speed Nt as described above. If affirmative decision is made in step S130, the actual rotation speed Na of the engine 1 is controlled to the target rotation speed Nt (see FIG. 8) corrected by the target rotation speed correction unit 10b in step 180.

The operations in the first embodiment are summarized below. During the excavation work, the operator switches the forward/reverse switching over switch 17 to the forward position and steps on the accelerator pedal 52 to generate the travel driving force corresponding to the pedal operation amount S so as to allow the wheel loader 100 to move toward the mound 130. The traveling load increases and the torque converter speed ratio e decreases as the bucket 112 is dug into the mound 130.

When the accelerator pedal 52 is eased off or operated in a release direction while the bucket 112 is dug into the mound 130, the target engine rotation speed Nt decreases. At this time, if the torque converter speed ratio e is smaller than the predetermined value e1, the rotation speed increase amount ΔN according to the characteristic as shown in FIG. 7 is added to the target engine rotation speed Nt according to the characteristic as shown in FIG. 4. As shown in FIG. 8, the engine rotation speed is corrected so that the target engine rotation speed Nt which is set according to the pedal operation amount S in the normal state is increased by ΔN, and the engine controller 9 controls the actual engine rotation speed Na to the corrected target engine rotation speed Nt (step S130 to step S180). In this manner, it is possible to prevent the actual engine rotation speed Lo from being reduced to Lon when the accelerator pedal 52 is eased off while the bucket 112 is dug into the mound 130.

As a result, the engine output torque is raised as shown in FIG. 9 so that it is possible to prevent the engine stall even if the front work device is activated in response to the operation of the control lever 31 after the accelerator pedal 52 is eased off with the bucket 112 dug into the mound 130.

The following operational effects can be achieved through the first embodiment described above.

(1) The controller 10 corrects and increases the target engine rotation speed Nt set according to the pedal operation amount S of the accelerator pedal 52 when the operation amount S of the accelerator pedal 52 is smaller than the predetermined value Sa and the torque converter speed ratio e is smaller than the predetermined value e1 set within the range equal to or greater than 0 and less than 1. Therefore, the engine stall can be prevented from occurring even when the control lever 31 is operated after the accelerator pedal 52 is eased off while the bucket 12 is dug into the mound, and thus the front work device, such as the bucket 112 and the arm 111, can be driven smoothly.

(2) Furthermore, since the target engine rotation speed Nt is corrected to be increased when the accelerator pedal 52 is eased off while traveling on an uphill, it is possible to prevent the engine stall from occurring.

(3) If the torque converter speed ratio e is below e1 while the accelerator pedal 52 is not stepped on (S=0), the low idle rotation speed Lo is increased by ΔN corresponding to the torque converter speed ratio e so as to improve the travel performance (or increase the driving force). Therefore, it is possible to prevent the vehicle from rolling back on an uphill by allowing the vehicle to slowly move forward at the low idle rotation speed Lo or by stopping the vehicle. In other words, it is not necessary to slightly depress the accelerator pedal 52 in order to keep the vehicle from rolling back on an uphill. That is, since it is not necessary to operate the accelerator pedal 52 a number of times to perform the work on an uphill while traveling at a slow speed, the drive operation on an uphill is facilitated.

On the other hand, with a conventional technology in which the low idle rotation speed Lo is not corrected based on the pedal operation amount S of the accelerator pedal 52 and the torque converter speed ratio e, the accelerator pedal 52 has to be stepped on minutely in order to allow the vehicle to travel forward at a slow speed or to stop the vehicle with the low idle rotation speed. As a result, with the conventional technology, the number of times of operating the accelerator pedal 52 tends to increase, causing the drive operation on an uphill to be complicated.

(4) In the present embodiment, since the low idle rotation speed Lo is raised only when the pedal operation amount S of the accelerator pedal 52 is less than the threshold value Sa in the load increase state (the torque converter speed ratio e is below e1), it is possible to prevent undesired increase in the creep speed when, for instance, creeping on a level ground.

If, on the other hand, it is configured such that the low idle rotation speed Lo is raised regardless of the torque converter speed ratio e, the creep speed may be increased in an undesired manner, and thus, a brake pedal (not shown) has to be operated to keep the vehicle to travel at a slow speed. In such a case, the operator is required to perform onerous, troublesome operations, causing the operator to fatigue.

(5) The low idle rotation speed is set to be higher as the torque converter speed ratio e is smaller. In this manner, the low idle rotation speed is increased by a greater extent as an angle of slope at an uphill is greater, and as a result, it is possible to prevent the creep speed from becoming too fast on a gentle upslope and also to prevent the vehicle from rolling back on a steep uphill. By increasing the low idle rotation speed by a greater extent as the torque converter speed ratio e is smaller during the excavation work, it is ensured that the engine stall attributable to operations at the front work device can be prevented.

Second Embodiment

An engine control device according to a second embodiment will now be explained with reference to FIGS. 12 to 14. In the figures, members identical to or equivalent to the members described in the first embodiment are assigned with the same reference numerals as the first embodiment, and the following explanation will focus on the differences from the first embodiment.

Figure 12:
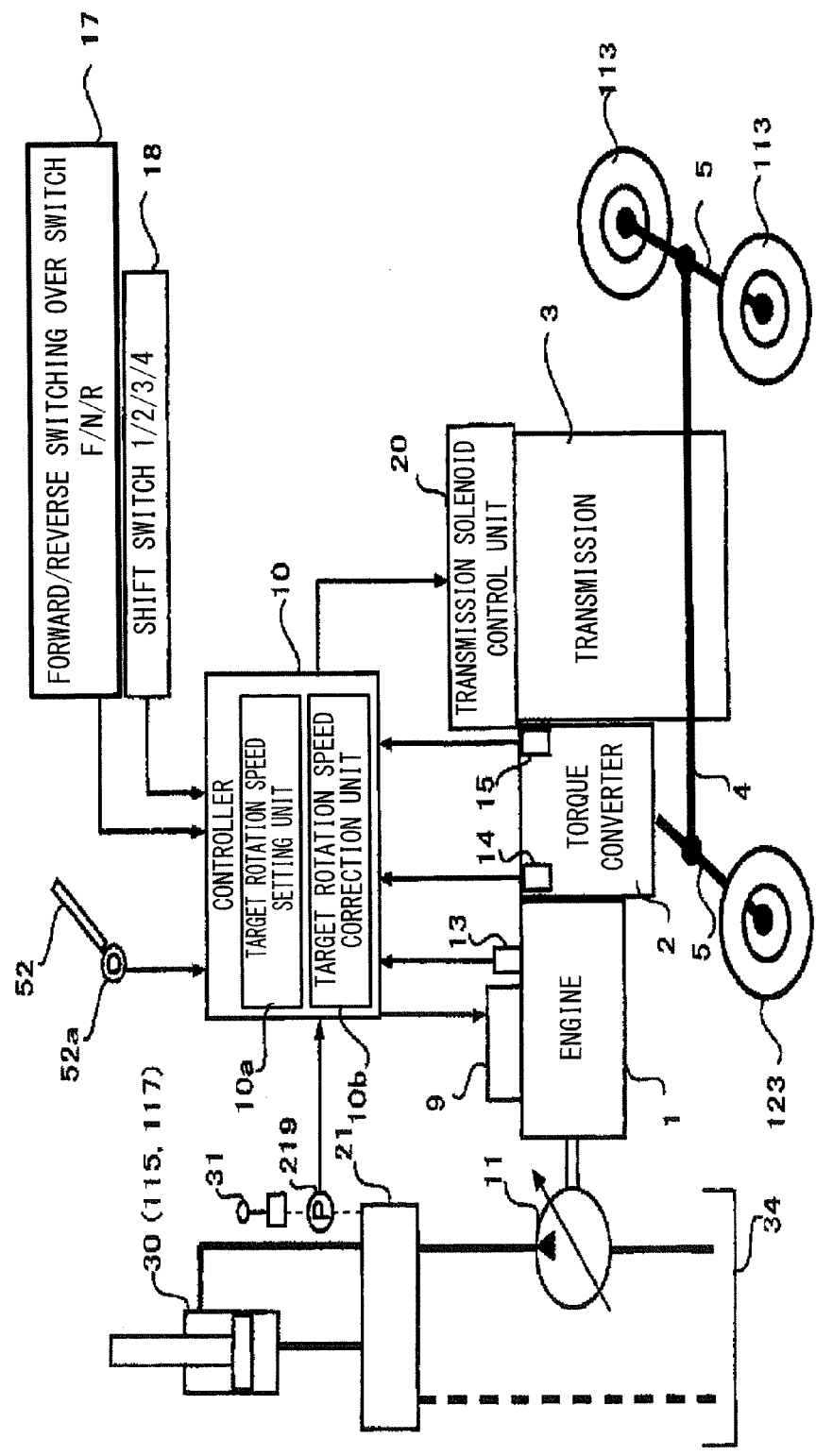
FIG. 12 shows a schematic diagram of a control system of the wheel loader equipped with the engine control device according to a second embodiment of the present invention.

FIG. 12 shows a schematic diagram of a control system of the wheel loader equipped with the engine control device according to the second embodiment of the present invention. As shown in FIG. 12, the wheel loader equipped with the engine control device according to the second embodiment further includes a pilot pressure sensor 219 for detecting that the front work device has been operated, in addition to the structure as described in the first embodiment.

In the second embodiment, the target rotation speed correction unit 10b corrects the target engine rotation speed Nt set with the target rotation speed setting unit 10a to be increased based on the torque converter speed ratio e, further taking into account the operation at the front work device detected by the pilot pressure sensor 219.

A signal from the pilot pressure sensor 219 is input to the controller 10. The pilot pressure sensor 219 detects a pilot pressure p indicating the lever operation amount L of the control lever 31 and outputs a lever signal to the controller 10. It is to be noted that although the pilot pressure sensor 219 is provided for each of the arm control lever and the bucket control lever which are represented as the control lever 31, FIG. 12 shows only one pilot pressure sensor 219 provided for one of the control levers as a representative example.

Figure 13:
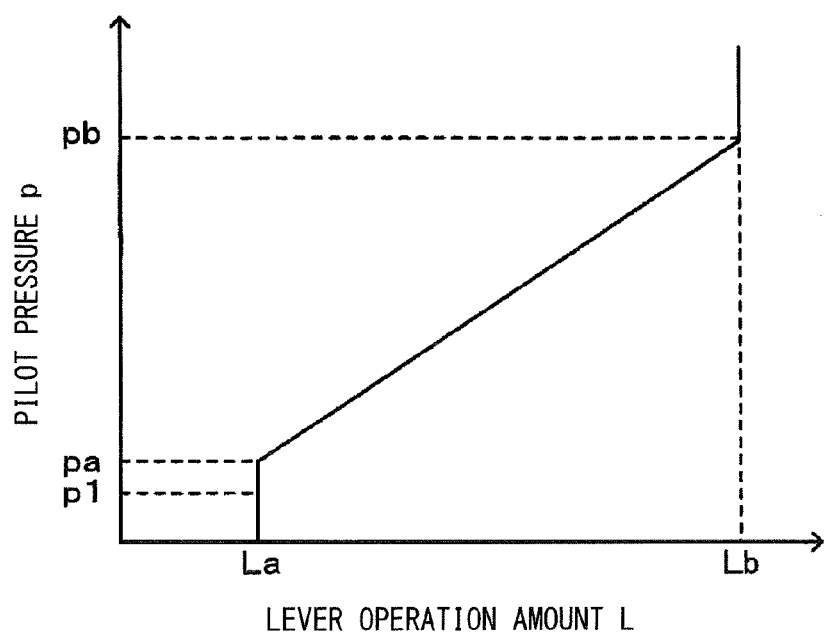
FIG. 13 shows relationship between lever operation amount of the control lever and pilot pressure.

FIG. 13 shows relationship between lever operation amount L of the control lever and pilot pressure p. The controller 10 determines whether or not the pilot pressure p is equal to or greater than a predetermined value p1 based on the signal from the pilot pressure sensor 219. The predetermined value p1 is defined as a value in a range which is equal to or greater than 0 and equal to or smaller than pa as shown in FIG. 13, and is stored in advance in the ROM or the RAM in the controller 10 as a threshold value for judging that the front work device has been operated.

Figure 14:
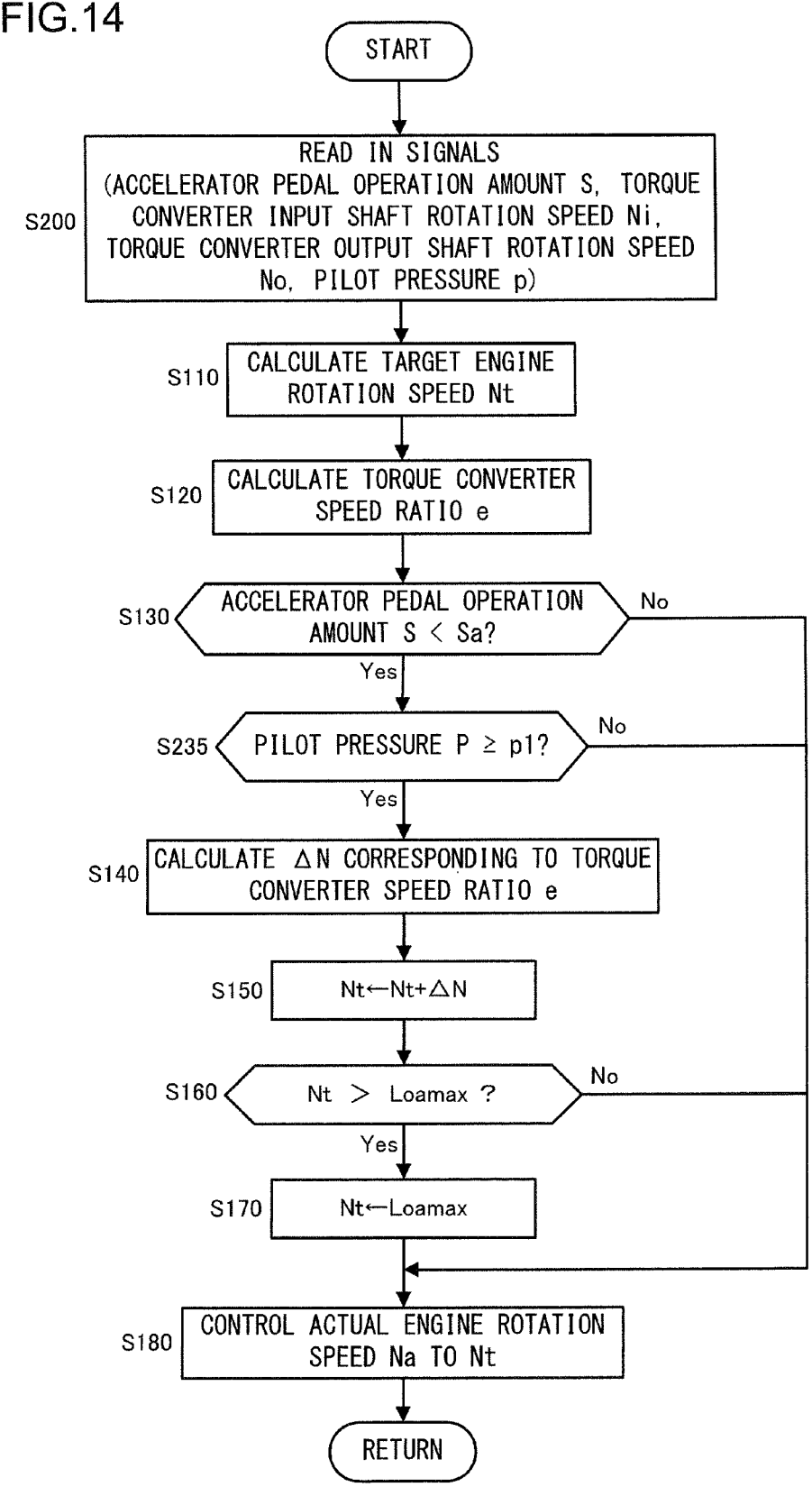
FIG. 14 is a flowchart that shows operation of engine rotation speed increase correction process in the engine control device according to the second embodiment of the present invention.

FIG. 14 is a flowchart that shows operation of engine rotation speed increase correction process executed in the engine control device according to the second embodiment of the present invention, and in the flowchart, step S235 is added to the flowchart shown in FIG. 11 and step S100 in the flowchart in FIG. 11 is replaced with step S200.

In the second embodiment, as shown in FIG. 14, information on the pilot pressure p detected by the pilot pressure sensor 219 is obtained in step S200, in addition to the information on the pedal operation amount S of the accelerator pedal 52 detected by the accelerator operation amount detector 52a, the information on the rotation speed Ni of the input shaft of the torque converter 2 detected by the rotation speed detector 14, and the information on the rotation speed No of the output shaft of the torque converter 2 detected by the rotation speed detector 15, and then the processing proceeds to step S110.

If affirmative decision is made in step S130 as described in the first embodiment, the processing proceeds to step S235. In step S235, it is determined whether or not the pilot pressure p is equal to or greater than p1. If affirmative decision is made in step S235, the processing proceeds to step S140 in which the process for correcting the target engine rotation speed Nt to be increased based on the torque converter speed ratio e is executed as explained in the first embodiment (step S140 to step S170). If negative decision is made in step S235, the processing proceeds to step S180 without correcting the target engine rotation speed Nt.

According to the second embodiment, the following advantage (6) is achieved in addition to the advantages (1) and (4) achieved in the first embodiment.

(6) Since the target engine rotation speed Nt is increased only when the operation of the front work device is detected, a frequency with which the actual engine rotation speed Na is increased can be reduced to the minimum necessary number and fuel consumption can be reduced.

Third Embodiment

An engine control device according to a third embodiment will now be explained with reference to FIGS. 15 to 18. In the figures, members identical to or equivalent to the members described in the first embodiment are assigned with the same reference numerals as the first embodiment, and the following explanation will focus on the differences from the first embodiment. The wheel loader equipped with the engine control device according to the third embodiment includes the same structure as that of the first embodiment (see FIGS. 1 and 2).

Figure 15:
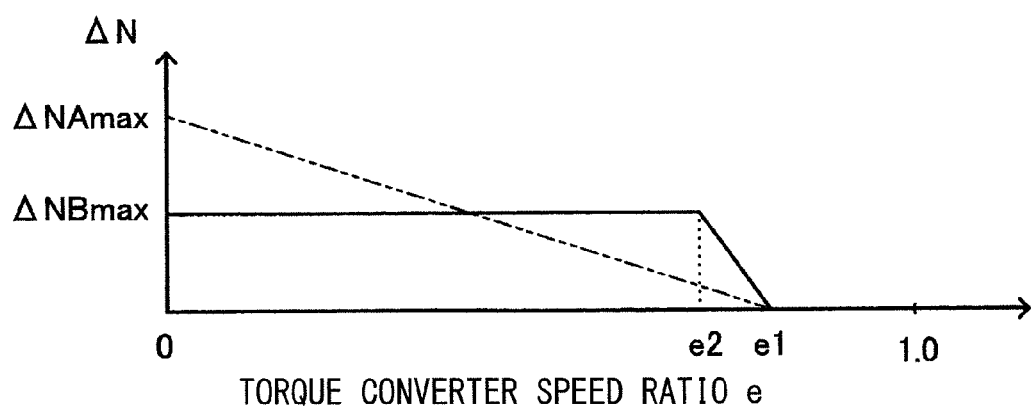
FIG. 15 shows characteristics of rotation speed increase amount to torque converter speed ratio stored in ROM or RAM in a controller of an engine control device according to a third embodiment of the present invention.

FIG. 15 shows characteristics of the rotation speed increase amount $\Delta N$ according to the torque converter speed ratio e stored in the ROM or the RAM in the controller 10 of the engine control device according to the third embodiment of the present invention. In FIG. 15, the characteristic of the rotation speed increase amount $\Delta N$ corresponding to the torque converter speed ratio e as described in the first embodiment is indicated by a two-dot chain line.

In the first embodiment, the characteristic of $\Delta N$ is such that $\Delta N$ increases from 0 to the upper limit value $\Delta NAmax$ (for example, 100 rpm) in proportion to decrease in the torque converter speed ratio e in the range of the torque converter speed ratio e which is equal to or greater than 0 and less than e1 ($0 \leq e < e1$). In the third embodiment, as indicated in FIG. 15, $\Delta N$ is 0 when the torque converter speed ratio e is equal to or greater than e1, and $\Delta N$ increases from 0 to an upper limit value $\Delta NBmax$ (for example, 50 rpm) in proportion to decrease in the torque converter speed ratio e when the torque converter speed ratio e is equal to or greater than e2 and less than e1 ($e2 \leq e < e1$). The rotation speed increase amount $\Delta N$ is at the maximum value $\Delta NBmax$ when the torque converter speed ratio e is equal to or greater than 0 and less than e2 (for example, 0.7) ($0 \leq e < e2$).

Figure 16:
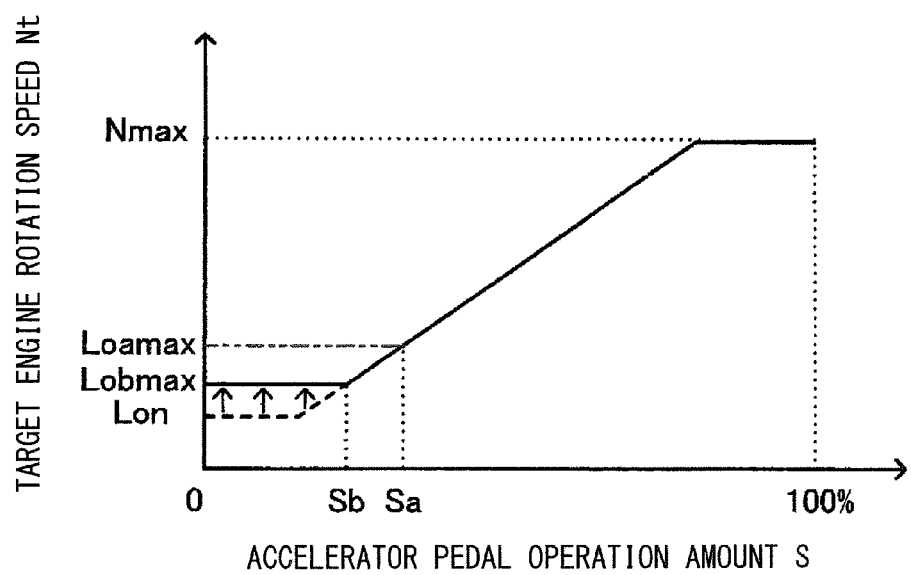
FIG. 16 shows relationship between the pedal operation amount of the accelerator pedal and the target engine rotation speed.

FIG. 16 shows relationship between the pedal operation amount S of the accelerator pedal 52 and the target engine rotation speed Nt. In FIG. 16, in a range of the pedal operation amount S of the accelerator pedal 52 which is equal to or greater than 0 and less than Sb, a characteristic in the normal state is indicated by a broken line and a corrected characteristic (with a maximum value Lobmax) by which the target engine rotation speed Nt is increased in the load increase state is indicated by a solid line. In FIG. 16, the maximum low idle rotation speed Loamax after increase correction as explained in the first embodiment is indicated by a two-dot chain line.

As shown in FIG. 16, if the wheel loader 100 is in the normal state, that is, if the torque converter speed ratio e is equal to or greater than the predetermined value e1, the low idle rotation speed Lo which corresponds to the target engine rotation speed Nt when the pedal is not operated (the pedal operation amount S=0) is set to Lon (for example, 900 rpm).

In the case where the wheel loader 100 is in the load increase state, that is, the torque converter speed ratio e is equal to or greater than 0 and less than e1, the low idle rotation speed Lo which corresponds to the target engine rotation speed Nt when the pedal is not stepped on (the pedal operation amount S=0) is set to a predefined value within a range equal to or greater than Lon and equal to or smaller than Lobmax. For instance, the low idle rotation speed Lo is corrected to Lobmax (for example, 950 rpm) calculated by adding $\Delta NBmax$ (for example, 50 rpm) to the rotation speed Lon (for example, 900 rpm) set by the target rotation speed setting unit 10a (Lobmax=Lon+$\Delta NBmax$) in the torque converter stall state (the torque converter speed ratio e=0).

Figure 17:
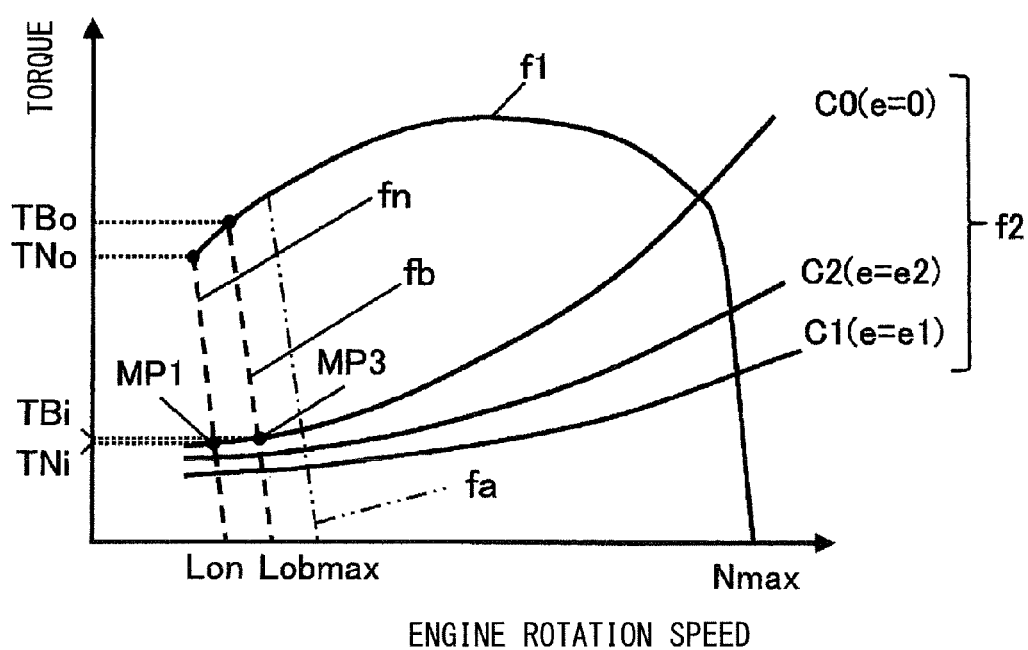
FIG. 17 is a travel performance diagram (torque diagram) representing relation between the engine rotation speed and torque.

FIG. 17 is a travel performance diagram (torque diagram) representing relation between the engine rotation speed and torque. In the figure, a characteristic f1 represents an engine output torque, and characteristics f2 (C0, C1, C2) represent input torque of the torque converter 2 when the torque converter speed ratio e is 0, e1 and e2, respectively. In the figure, a characteristic fn (indicated by a broken line) represents an engine output torque when the low idle rotation speed Lo=Lon, and a characteristic fb (indicated by a broken line) represents an engine output torque when the low idle rotation speed Lo is increased by the maximum increase amount $\Delta NBmax$, that is, when the low idle rotation speed Lo=Lobmax. It is to be noted that the characteristic fa representing the engine output characteristic with the maximum low idle rotation speed Loamax after increase correction as described in the first embodiment is indicated by a two-dot chain line in FIG. 17.

Explanation will be given below with the torque converter stall state (torque converter speed ratio e=0) as a representative example. In FIG. 17, the matching point is shifted from MP1 to MP3 when the low idle rotation speed Lo is increased by the maximum increase amount $\Delta NBmax$.

As shown in FIG. 17, a torque converter input torque TBi at the matching point MP3 with the low idle rotation speed Lo=Lobmax is greater than a torque converter input torque TNi at the matching point MP1 with the low idle rotation speed Lo=Lon. On the other hand, an engine output torque TBo in the low idle rotation speed Lo=Lobmax is greater than an engine output torque TNo in the low idle rotation speed Lo=Lon.

However, as shown in FIG. 17, an extent of rising (TBi−TNi) by which the torque converter input torque is increased when the low idle rotation speed Lo is increased by the maximum increase amount ΔNBmax is smaller than an extent of rising (TBo−TNo) by which the engine output torque is increased. Thus, a pump absorption torque that can be used in a hydraulic circuit of excavation system can be increased by correcting and increasing the low idle rotation speed Lo. In other words, the pump absorption torque Tpb (=TBo−TBi) in the low idle rotation speed Lo=Lobmax after increase correction is larger than the pump absorption torque Tpn (=TNo−TNi) with the low idle rotation speed Lo=Lon in the normal state.

Figure 18:
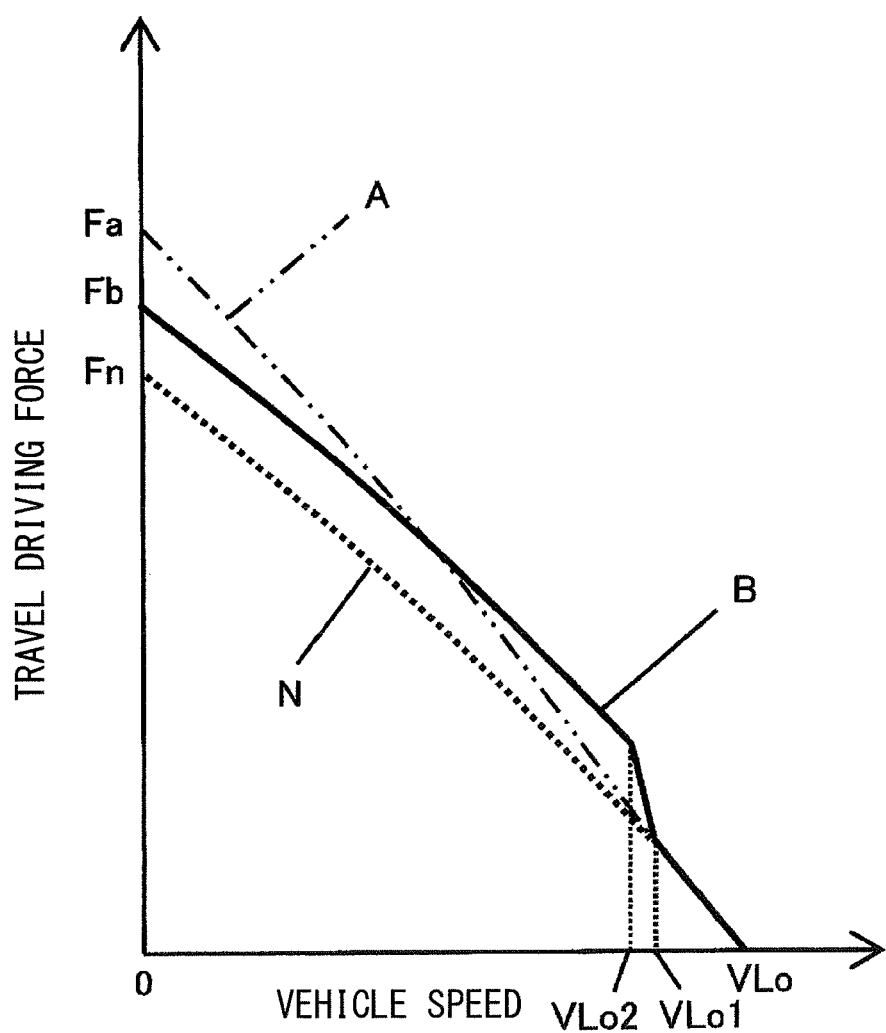
FIG. 18 shows relationship between vehicle creep speed and travel driving force.

FIG. 18 shows relationship between the vehicle creep speed and the travel driving force. In FIG. 18, a characteristic N shows a driving performance when the vehicle creeps at the low idle rotation speed Lo=Lon, and a characteristic B shows a driving performance when the vehicle creeps at the low idle rotation speed Lo=Lobmax, with both of the characteristics represent characteristics at the second speed as an example. It is to be noted that in FIG. 18, the characteristic A representing when the vehicle creeps at the low idle rotation speed Lo=Loamax is indicated by a two-dot chain line. As shown in FIG. 18, the travel driving force is larger at a lower speed (low-speed-high-torque), and the travel driving force is smaller at a faster speed (high-speed-low-torque) for both of the characteristics N and B.

As shown in FIG. 18, the travel driving force at a time of creep traveling with the low idle rotation speed Lo corrected and increased is larger than the travel driving force at a time of creep traveling in the normal state (without correction). As to the difference between the travel driving forces, for instance at a time of stall (the vehicle speed v=0), a travel driving force Fb with correction is approximately 1.1 times greater than a travel driving force Fn in the normal state. A maximum vehicle speed when creep traveling is a predetermined value VLo for both of the characteristics N and B. The characteristic B corresponds with the characteristic of the rotation speed increase amount ΔN depending on the torque converter speed ratio e as shown in FIG. 15. When the vehicle speed is equal to or greater than VLo1 and equal to or less than VLo, the characteristic B and the characteristic N coincide with one another. In a range of the vehicle speed which is equal to or greater than VLo2 and less than VLo1, the travel driving force of the characteristic B becomes greater as the vehicle speed decreases, as compared with the characteristic N. In a range of the vehicle speed which is equal to or greater than 0 and less than VLo2, the traveling drive force of the characteristic B is larger than the characteristic N by a constant amount.

In the third embodiment, in place of step S130 in the flowchart of FIG. 11, it is determined whether or not correction based on the torque converter speed ratio e is to be executed by judging whether the accelerator pedal operation amount S is less than Sb or not.

In the third embodiment, the increase amount ΔN for the target engine rotation speed Nt is increased as the torque converter speed ratio e decreases according to the characteristic shown in FIG. 15, in place of the characteristic shown in FIG. 7 in the first embodiment. Even if the rotation speed increase amount ΔN is set to be constant when the torque converter speed ratio e is equal to or greater than 0 and less than e2 in the third embodiment, the advantages (1) to (4) can be achieved as in the first embodiment.

Fourth Embodiment

An engine control device according to a fourth embodiment will now be explained with reference to FIG. 19. In the figure, members identical to or equivalent to the members in the third embodiment are assigned with the same reference numerals as those in the third embodiment, and the following explanation will focus on the differences from the third embodiment. The wheel loader equipped with the engine control device according to the fourth embodiment includes the structure as described in the third embodiment (see FIGS. 1 and 2). In the engine control device according to the fourth embodiment, the target engine rotation speed Nt is corrected by increasing the increase amount ΔN in the target engine rotation speed Nt as the torque converter speed ratio e decreases in accordance with the characteristic indicated in FIG. 15 as described in the third embodiment.

Figure 19:
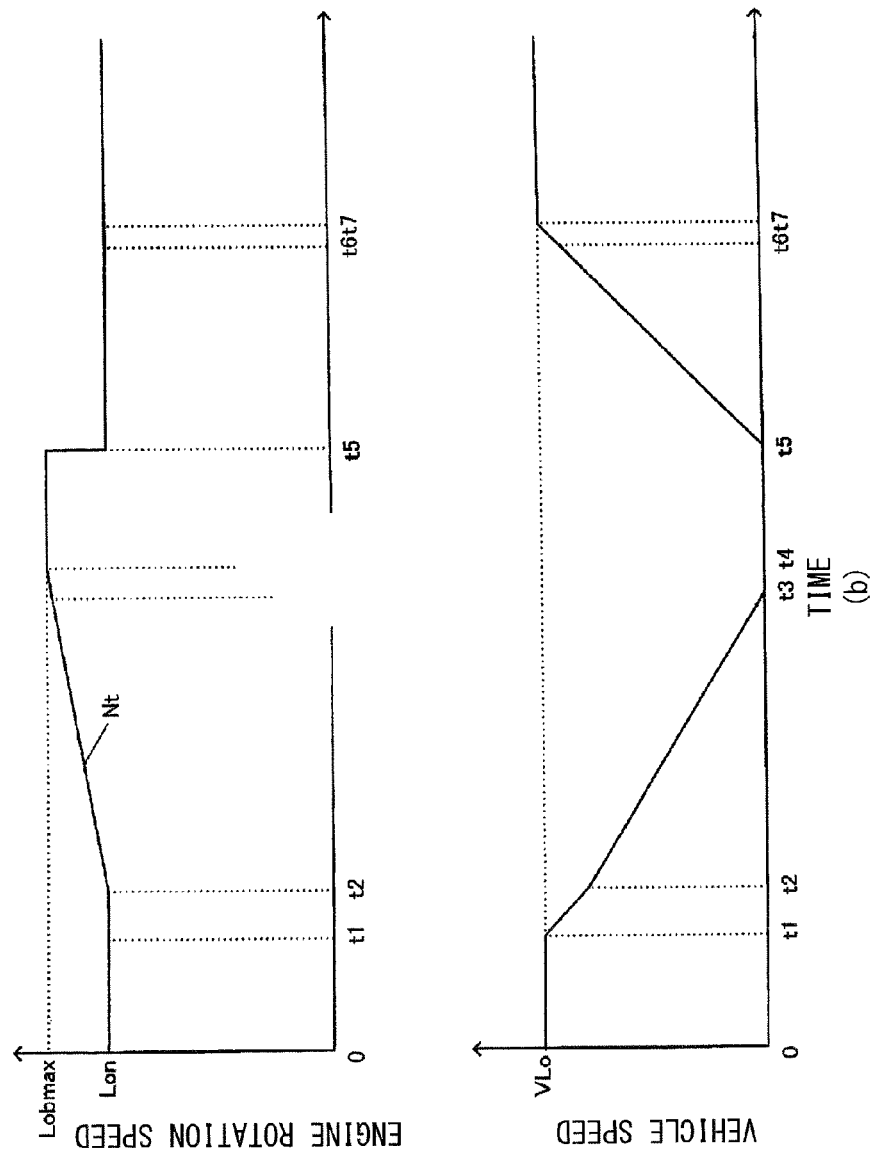
FIG. 19 shows time charts illustrating operation for stopping the wheel loader, equipped with the engine control device according to a fourth embodiment of the present invention, that is creeping and operation for creep starting the vehicle that is in the stopped state.

FIG. 19 shows time charts illustrating operation for stopping the wheel loader that is creeping or traveling slowly and operation for creep starting the vehicle that is in the stopped state, with the wheel loader equipped with the engine control device according to the fourth embodiment of the present invention.

In the fourth embodiment, if the target engine rotation speed Nt is corrected by the target rotation speed correction unit 10b, the controller 10 gradually increases the actual rotation speed Na of the engine 1 toward the target engine rotation speed Nt corrected by the target rotation speed correction unit 10b. If, after the target engine rotation speed Nt is corrected by the target rotation speed correction unit 10b, the target engine rotation speed Nt according to the pedal operation amount S at the accelerator pedal 52, that is, a target engine rotation speed without correction, is set again by the target rotation speed setting unit 10a, the controller 10 decreases the actual rotation speed Na of the engine 1 immediately to the target engine rotation speed Nt set by the target rotation speed setting unit 10a.

Explanation will be given in more specific terms in reference to FIG. 19. FIG. 19(a) is a schematic diagram showing a time series variation in the target engine rotation speed Nt, and FIG. 19(b) is a schematic diagram showing a time series variation in the vehicle speed. Although not shown in the figures, the actual rotation speed Na of the engine 1 varies following the target engine rotation speed Nt set by the target rotation speed setting unit 10a.

The wheel loader 100 creeps or travels slowly at the low idle rotation speed Lo=Lon and the vehicle speed VLo from a time point 0 to a time point t1. In the case where a brake pedal (not shown) is operated so as to activate a well-known service brake device (not shown) from the time point t1 to a time point t5, the target engine rotation speed Nt is set to Lon from the time point t1 to a time point t2. When the torque converter speed ratio e becomes less than e1 at the time point t2 due to increase in the traveling load caused by activation of the service brake device, the target engine rotation speed Nt is corrected to be increased.

For instance, if the torque converter speed ratio e becomes less than e2 at the time point t2, the target rotation speed correction unit 10b corrects the target engine rotation speed Nt to Lobmax (Nt=Lobmax) by adding ΔNBmax to the target rotation speed Nt set by the target rotation speed setting unit 10a.

At the time point t2, the target engine rotation speed Nt is corrected or calculated to be Lobmax. As shown in FIG. 19(a), the controller 10 sets the target engine rotation speed Nt to be increased gradually toward Lobmax over time (approximately overt to 1.5 seconds) so that the target engine rotation speed Nt reaches Lobmax at a time point t4. The actual rotation speed Na of the engine 1 is gradually raised toward the corrected target engine rotation speed Nt=Lobmax.

The vehicle speed decreases gradually from the time point t1 to a time point t3 and becomes 0 at the time point t3. The vehicle starts creeping upon release of the brake pedal (not shown) at the time point t5. The torque converter speed ratio e reaches e1 or more at the time point t5, and the target engine rotation speed Nt is set to the rotation speed Lon corresponding to the pedal operation amount S=0 of the accelerator pedal 52. The controller 10 sets the target engine rotation speed Nt to Lon at once at the time point t5 so as to decrease the actual rotation speed Na of the engine 1 immediately to Lon.

The vehicle speed increases smoothly from the time point t5, and reaches a predetermined speed (the creep speed maximum value VLo) at a time point t7.

Figure 20:
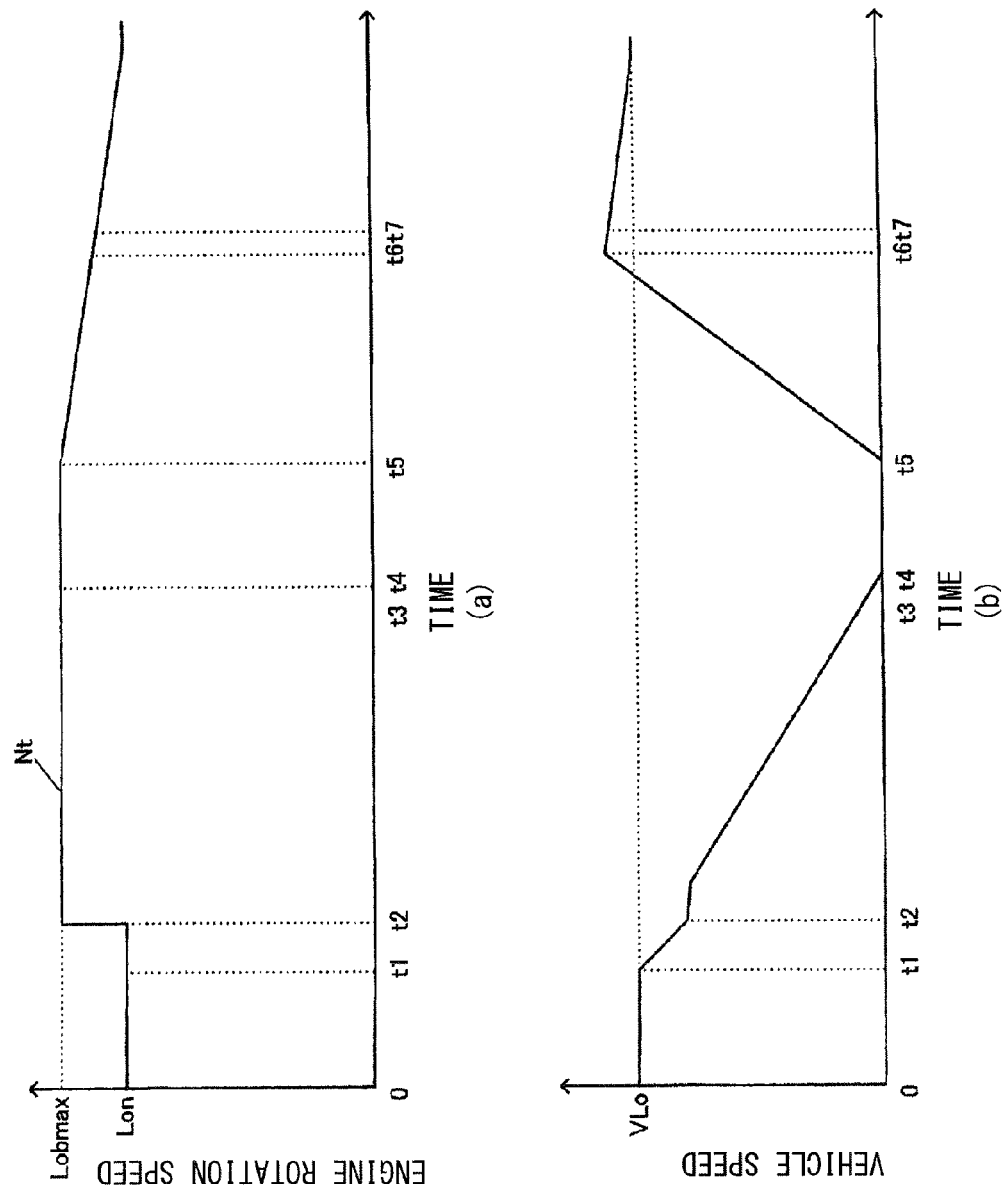
FIG. 20 shows a comparison example to FIG. 19.

FIG. 20 shows a comparison example to FIG. 19. As shown in the comparison example in FIG. 20, the controller 10 instantly sets the target engine rotation speed Nt to the corrected rotation speed Lobmax at the time point t2.

In the case where the target engine rotation speed Nt is set to the corrected, increased value at once at the time point t2, the actual rotation speed Na of the engine 1 is increased sharply and decrease in the vehicle speed is interrupted temporarily so that the vehicle will be subjected to a great shock. Since the actual rotation speed Na of the engine 1 rises abruptly, a stopping distance of the vehicle is prolonged and the vehicle stops at the time point t4.

The torque converter speed ratio e becomes e1 or more at the time point t5, and thus, the target engine rotation speed Nt is again set to the target engine rotation speed Nt corresponding to the operation amount of the accelerator pedal 52 at the time point t5. In the comparison example, the target engine rotation speed Nt is set to be decreased gradually over time from the corrected target engine rotation speed Nt=Lobmax to the target engine rotation speed Nt=Lon corresponding to the operation amount of the accelerator pedal 52. As a result, since the actual rotation speed Na decreases gradually, the vehicle speed exceeds the creep vehicle speed VLo and rises further (a time point t6), and then decreases gradually toward the creep vehicle speed VLo.

According to the fourth embodiment, the following advantages (7) and (8) are achieved in addition to the advantages (1) to (4) as in the first embodiment.

(7) In the fourth embodiment, as shown in FIG. 19, in the case where the brake pedal (not shown) is stepped on to stop the vehicle while creeping or traveling slowly at the low idle rotation speed Lo=Lon, the engine rotation speed gradually increases over time (approximately over 1 to 1.5 seconds) even when the torque converter speed ratio e is reduced. As a result, the operator will not feel a sense of discomfort caused by change as the actual engine rotation speed Na increases. In addition, the travel driving force increases and changes smoothly, and thus, a shock will not be applied to the vehicle (see FIG. 20).

(8) In the fourth embodiment, as shown in FIG. 19, when starting the stopped wheel loader 100, the brake pedal (not shown) is released so as to start creep traveling, and then, once the torque converter speed ratio e reaches the predetermined value e1 or more, the actual engine rotation speed Na is decreased immediately. In this manner, behavior in which the vehicle speed is decreased after the creep speed becomes too fast (see FIG. 20) is prevented, and as a result, the vehicle speed can be increased, that is, accelerated smoothly.

The present invention also includes the following variations, and one or more of the variations can be combined with any of the embodiments described above.

VARIATIONS (1) In the second embodiment described above, it is determined whether or not the front work device is operated based on the pilot pressure information provided by the pilot pressure sensors 219 for detecting operating pilot pressures at the arm control lever and the bucket control lever represented as the control lever 31, and the correction control of the target engine rotation speed Nt is executed based on the accelerator pedal operation amount S and the torque converter speed ratio e when the pilot pressure p becomes the predetermined value p1 or greater. However, the present invention is not limited to this example.

For instance, a pump pressure sensor (not shown) for detecting a pump discharge pressure Pp at the hydraulic pump 11 may be provided so as to detect that the front work device has been operated based on the pump discharge pressure Pp input to the controller 10 from the pump pressure sensor, and the correction control of the target engine rotation speed Nt may be executed based on the accelerator pedal operation amount S and the torque converter speed ratio e. In this case, in place of step S200 in the flowchart in FIG. 14, the information on the pedal operation amount S of the accelerator pedal 52 detected by the accelerator operation amount detector 52a, the information on the rotation speed Ni of the input shaft of the torque converter 2 detected by the rotation speed detector 14, the information on the rotation speed No of the output shaft of the torque converter 2 detected by the rotation speed detector 15, and information on the pump pressure Pp detected by the pump pressure sensor are obtained, and then the processing proceeds to step S110.

Furthermore, in place of step S235 in the flowchart in FIG. 14, the controller 10 may execute processing for judging whether or not the pump pressure Pp is equal to or greater than a predetermined value Pp1, and if affirmative judgment is made, the processing proceeds to step S140 whereas the processing proceeds to step S180 if negative judgment is made. Here, the predetermined value Pp1 (for instance, 5 MPa) is stored in advance in the ROM or the RAM in the controller 10 as a threshold value representing that the front work device has been operated.

(2) While in the embodiments described above, the rotation speed increase amount ΔN is increased with decrease in the torque converter speed ratio e when the torque converter speed ratio e is equal to or greater than 0 and less than e1, the present invention is not limited to this example. ΔN may be set as a fixed value when the torque converter speed ratio e is within a range which is equal to or greater than 0 and less than e1.

(3) While in the embodiments described above, the explanation was made by giving the wheel loader 100 including the arm 111 and the bucket 112 as the front work device as an example of a work vehicle, the present invention is not limited to this example and other work vehicles such as a wheel excavator, a forklift, a telehandler, or a lift truck may be given as examples.

The explanation was given above in reference to the embodiments and the variations, however, the present invention is not limited to these examples. Other aspects that can be considered within the scope of the technical concept of the present invention are also included within the scope of the present invention.

The disclosure of the following priority application is herein incorporated by reference: Japanese Patent Application No. 2012-021749 filed Feb. 3, 2012.

The invention claimed is:

1. An engine control device for work vehicle, comprising:
a target rotation speed setting unit that sets a target rotation speed of an engine corresponding to an operation amount of an accelerator pedal;
a rotation speed control unit that controls a rotation speed of the engine according to the target rotation speed;
a travel driving unit that transmits rotation of the engine to wheels via a torque converter;
a speed ratio detection unit that detects a speed ratio between an input shaft and an output shaft of the torque converter; and
a target rotation speed correction unit that corrects the target rotation speed set by the target rotation speed setting unit so as to increase the target rotation speed based on the speed ratio when the operation amount of the accelerator pedal is smaller than a predetermined value and the speed ratio detected by the speed ratio detection unit is smaller than a predetermined value within a range which is equal to or greater than 0 and less than 1.

2. The engine control device for work vehicle according to claim 1, wherein:
the target rotation speed correction unit increases an increase amount for increasing the target rotation speed with decrease in the speed ratio.

3. The engine control device for work vehicle according to claim 1, wherein:
when the target rotation speed is corrected by the target rotation speed correction unit, the rotation speed control unit gradually increases the rotation speed of the engine toward the target rotation speed corrected by the target rotation speed correction unit; and when the target rotation speed setting unit again sets the target rotation speed that is not corrected and corresponds to the operation amount of the accelerator pedal after the target rotation speed was corrected by the target rotation speed correction unit, the rotation speed control unit immediately decreases the rotation speed of the engine to the target rotation speed set by the target rotation speed setting unit.

4. The engine control device for work vehicle according to claim 1, further comprising:
an operation detection unit that detects that a front work device has been operated, wherein:
the target rotation speed correction unit corrects the target rotation speed set by the target rotation speed setting unit so as to increase the target rotation speed based on the speed ratio, taking into account operation of the front work device detected by the operation detection unit.

* * * * *